(12) United States Patent
Nomura et al.

(10) Patent No.: US 7,388,722 B2
(45) Date of Patent: Jun. 17, 2008

(54) LENS BARREL INCORPORATING A ROTATABLE OPTICAL ELEMENT

(75) Inventors: Hiroshi Nomura, Saitama (JP); Kiyoshi Kawano, Saitama (JP)

(73) Assignee: HOYA Corporation, Tokyo (JP)

( * ) Notice: Subject to any disclaimer, the term of this patent is extended or adjusted under 35 U.S.C. 154(b) by 0 days.

(21) Appl. No.: 11/421,223

(22) Filed: May 31, 2006

(65) Prior Publication Data
US 2006/0274435 A1    Dec. 7, 2006

(30) Foreign Application Priority Data
Jun. 1, 2005    (JP)    ............ P2005-161915

(51) Int. Cl.
G02B 7/02    (2006.01)
(52) U.S. Cl. ............ 359/819; 359/821; 359/822; 359/811
(58) Field of Classification Search ............ 359/819, 359/821, 822, 823, 811, 813
See application file for complete search history.

(56) References Cited
U.S. PATENT DOCUMENTS

| | | | |
|---|---|---|---|
| 4,721,972 | A | 1/1988 | Wakabayashi |
| 4,771,303 | A | 9/1988 | Matsumoto et al. |
| 4,792,822 | A | 12/1988 | Akiyama et al. |
| 4,825,235 | A | 4/1989 | Wakabayashi et al. |
| 4,937,609 | A | 6/1990 | Wakabayashi et al. |
| 5,608,580 | A * | 3/1997 | Quadri ............ 359/831 |
| 5,737,644 | A | 4/1998 | Nomura et al. |
| 5,793,537 | A | 8/1998 | Nomura et al. |
| 5,812,887 | A | 9/1998 | Nomura et al. |
| 6,023,376 | A | 2/2000 | Nomura et al. |
| 6,115,190 | A | 9/2000 | Hirai |
| 6,204,977 | B1 | 3/2001 | Iwasa |
| 6,366,323 | B1 | 4/2002 | Shono |
| 6,952,526 | B2 | 10/2005 | Nomura |
| 6,959,148 | B2 | 10/2005 | Nomura |
| 6,963,694 | B2 | 11/2005 | Nomura |
| 6,965,733 | B1 | 11/2005 | Nomura |
| 6,978,088 | B2 | 12/2005 | Nomura |

(Continued)

FOREIGN PATENT DOCUMENTS

JP    8-334809    12/1996

(Continued)

OTHER PUBLICATIONS

English Language Abstract of JP 8-334809.

(Continued)

*Primary Examiner*—Timothy J Thompson
(74) *Attorney, Agent, or Firm*—Greenblum & Bernstein, P.L.C.

(57) ABSTRACT

A lens barrel includes an imaging optical system including a plurality of lens groups located on an optical axis; an insertable/rotatable optical element which produces a specific photographic effect when rotated on the optical axis; and a drive mechanism including a motor which moves the insertable/rotatable optical element between an inserted position, in which the insertable/rotatable optical element is positioned on the optical axis, and a removed position, in which the insertable/rotatable optical element is removed from the optical axis by forward and reverse rotations of the motor, respectively. The drive mechanism rotates the insertable/rotatable optical element on the optical axis by the forward rotation of the motor when the insertable/rotatable optical element is in the inserted position.

12 Claims, 29 Drawing Sheets

U.S. PATENT DOCUMENTS

| | | |
|---|---|---|
| 6,978,089 B2 | 12/2005 | Nomura et al. |
| 6,987,929 B2 | 1/2006 | Nomura |
| 6,987,930 B2 | 1/2006 | Nomura |
| 6,990,291 B2 | 1/2006 | Nomura |
| 7,010,224 B2 | 3/2006 | Nomura |
| 7,013,081 B2 | 3/2006 | Nomura et al. |
| 7,019,915 B2 | 3/2006 | Sakamoto |
| 7,025,512 B2 | 4/2006 | Nomura |
| 7,027,727 B2 | 4/2006 | Nomura |
| 7,031,603 B2 | 4/2006 | Nomura |
| 7,031,604 B2 | 4/2006 | Nomura |
| 7,035,535 B2 | 4/2006 | Nomura |
| 7,039,308 B2 | 5/2006 | Nomura |
| 7,039,311 B2 | 5/2006 | Nomura |
| 7,043,154 B2 | 5/2006 | Nomura |
| 7,050,713 B2 | 5/2006 | Nomura |
| 7,058,293 B2 | 6/2006 | Nomura |
| 7,062,163 B2 | 6/2006 | Nomura |
| 7,068,929 B2 | 6/2006 | Nomura |
| 7,079,761 B2 | 7/2006 | Nomura |
| 7,079,762 B2 | 7/2006 | Nomura |
| 7,085,486 B2 | 8/2006 | Nomura |
| 7,088,916 B2 | 8/2006 | Nomura |
| 2004/0051968 A1 | 3/2004 | Nomura |
| 2004/0141737 A1 | 7/2004 | Nomura |
| 2005/0168847 A1 | 8/2005 | Sasaki |
| 2005/0169621 A1 | 8/2005 | Nomura |
| 2005/0254140 A1 | 11/2005 | Sakamoto |

FOREIGN PATENT DOCUMENTS

| | | |
|---|---|---|
| JP | 2001-264610 | 9/2001 |

OTHER PUBLICATIONS

U.S. Appl. No. 11/421,267 to Nomura et al., filed on May 31, 2006.
U.S. Appl. No. 11/425,009 to Nomura et al., filed on Jun. 19, 2006.
U.S. Appl. No. 11/425,168 to Nomura, filed on Jun. 20, 2006.
U.S. Appl. No. 11/420,952 to Sasaki, filed on May 30, 2006.
U.S. Appl. No. 11/420,680 to Sasaki, filed on May 26, 2006.
U.S. Appl. No. 11/458,491 to Nomura, filed on Jul. 19, 2006.
U.S. Appl. No. 11/458,586 to Nomura, filed on Jul. 19, 2006.
U.S. Appl. No. 10/815,193 to Shono, filed on Apr. 1, 2004.
U.S. Appl. No. 10/815,194 to Shono, filed on Apr. 1, 2004.

* cited by examiner

Fig. 12
Fig. 13
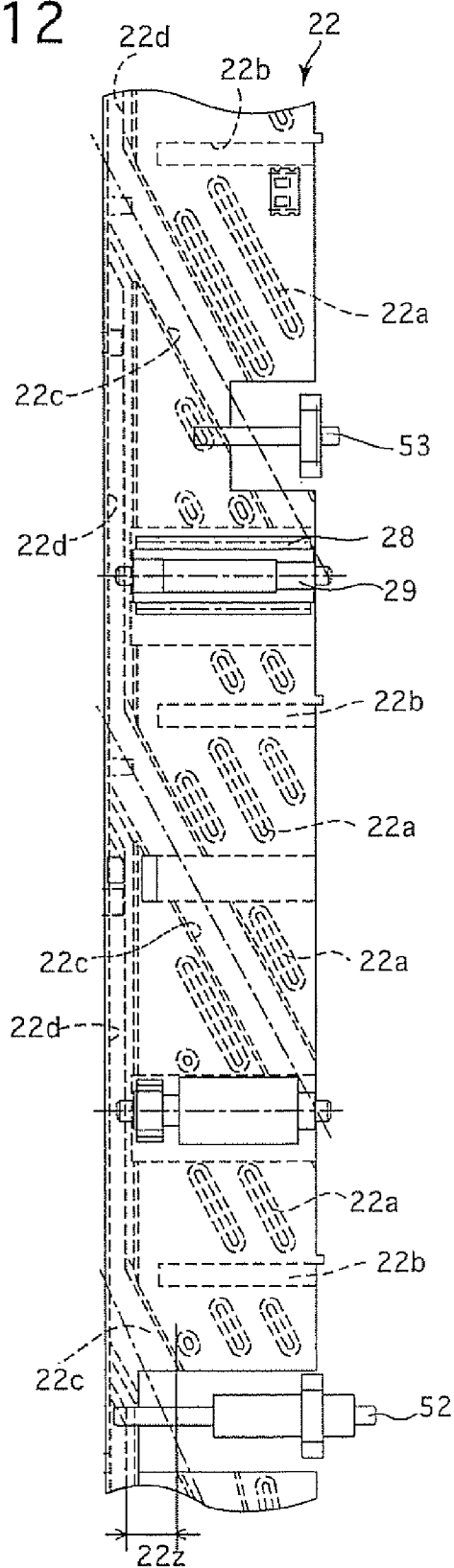
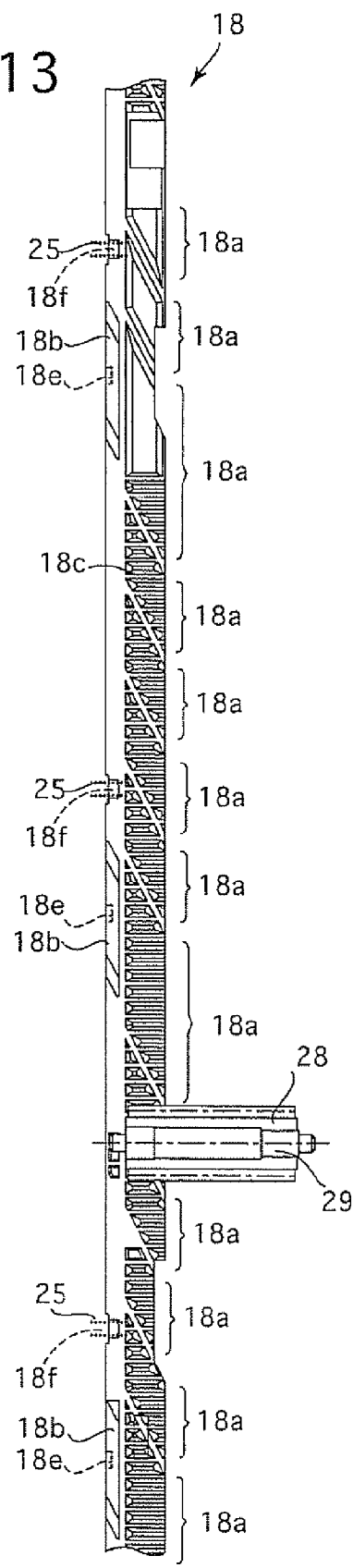

Fig. 14
Fig. 15
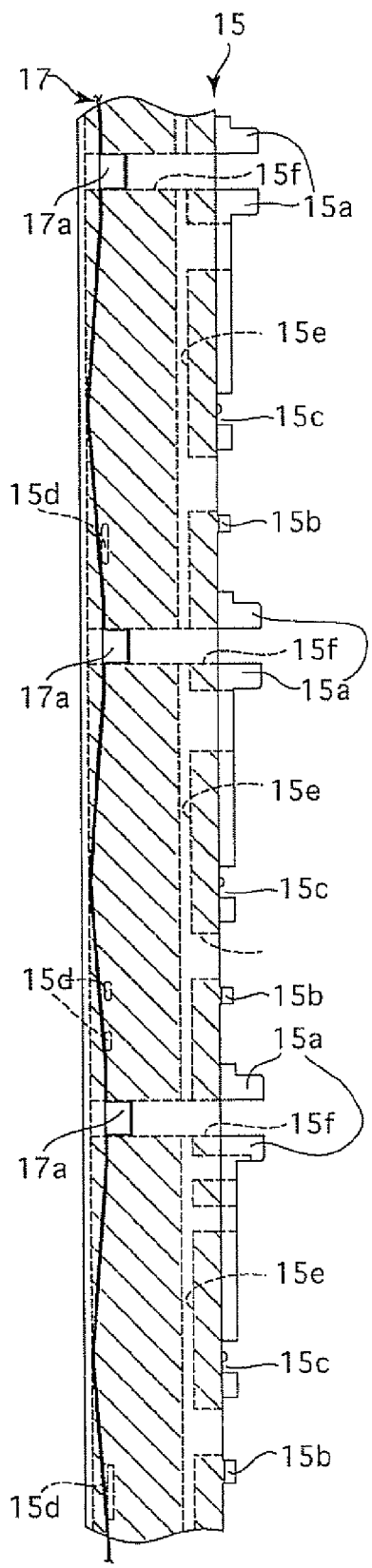
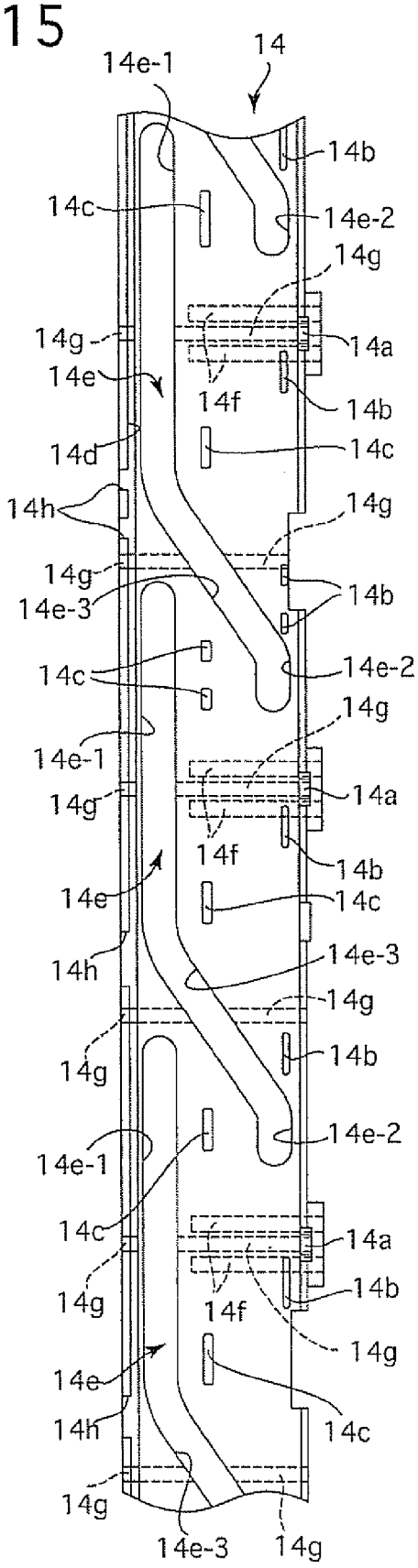

LENS BARREL INCORPORATING A ROTATABLE OPTICAL ELEMENT

BACKGROUND OF THE INVENTION

1. Field of the Invention

The present invention relates to a lens barrel, more specifically relates to a lens barrel incorporating at least one rotatable optical element that produces a specific photographic effect when rotated on a photographing optical axis.

2. Description of the Related Art

In a lens barrel which incorporates an optical element (e.g., an optical filter or a wide-converter lens) that produces a predetermined photographic effect when inserted into an optical path on a photographing optical axis, it is necessary to remove such an optical element from a position on the photographing optical axis when the optical element is not used. Among such kind of optical elements, in a particular type of optical element which functions when driven to rotate such as a polarizing filter, the optical element needs to be driven not only to be inserted into and removed from an optical path on the photographing optical axis but also to rotate in an inserted state of the optical element, which may complicate the drive mechanism for the optical element.

SUMMARY OF THE INVENTION

The present invention provides a lens barrel incorporating a specific-effect producing rotatable optical element (insertable/rotatable optical element) which is freely inserted into and removed from an optical path on a photographing optical axis and which is driven to rotate on the photographing optical axis to produce a specific photographic effect, wherein the specific-effect producing rotatable optical element can be driven by a simple and small drive mechanism.

According to an aspect of the present invention, a lens barrel is provided, including an imaging optical system including a plurality of lens groups located on an optical axis; an insertable/rotatable optical element which produces a specific photographic effect when rotated on the optical axis; and a drive mechanism including a motor which moves the insertable/rotatable optical element between an inserted position, in which the insertable/rotatable optical element is positioned on the optical axis of the imaging optical system, and a removed position, in which the insertable/rotatable optical element is removed from the optical axis by forward and reverse rotations of the motor, respectively. The drive mechanism rotates the insertable/rotatable optical element on the optical axis by the forward rotation of the motor when the insertable/rotatable optical element is in the inserted position.

It is desirable for the drive mechanism to include an insertable/retractable frame pivoted about a pivot parallel to the optical axis to be rotatable forward and reverse to move the insertable/rotatable optical element between the inserted position and the removed position; an annular holding frame which holds the insertable/rotatable optical element, and is rotatably supported by the insertable/retractable frame; and a gear train for transmitting a rotational driving force of the motor to the annular holding frame.

It is desirable for the gear train to include a sun gear arranged coaxially with the pivot to be rotatable thereon; a planetary gear which meshes with the sun gear, the planetary gear being rotatably supported by the insertable/retractable frame and capable of transmitting a rotation thereof to the annular holding frame; and a drive controller which causes the planetary gear revolve forward and reverse around the sun gear while rotating on an axis of the planetary gear in accordance with forward and reverse rotations of the motor when the insertable/retractable frame rotates forward and reverse to move the insertable/rotatable optical element between the inserted position and the removed position, respectively, and further causes the planetary gear to rotate on the axis thereof without changing a relative position between the planetary gear and the sun gear to thereby rotate the annular holding frame in accordance with the forward rotation of the motor when the insertable/retractable frame is in a position so that the insertable/rotatable optical element is positioned at the inserted position.

It is desirable for the drive controller to include a rotation-resistance imposing member which imposes rotational resistance on at least one gear of the gear train; and a rotation limit member which prevents the insertable/retractable frame from further rotating forward to thereby prevent the insertable/rotatable optical element from moving beyond the inserted position when the insertable/rotatable optical element is positioned at the inserted position. When the rotation limit member does not prevent the insertable/retractable frame from rotating, the rotation-resistance imposing member prevents the planetary gear from rotating about the axis thereof so that the planetary gear revolves around the sun gear in accordance with forward and reverse rotations of the motor. When the rotation limit member prevents the insertable/retractable frame from rotating at the inserted position of the insertable/rotatable optical element, the rotation-resistance imposing member allows the planetary gear to rotate about the axis thereof in accordance with the forward rotation of the motor.

It is desirable for the insertable/rotatable optical element to include a polarizing filter.

The insertable/rotatable optical element can be rotated at the fixed position about the optical axis by the drive mechanism when positioned at the inserted position.

It is desirable for the lens barrel to include a second drive mechanism which positions the plurality of lens groups on the optical axis in a ready-to-photograph state of the lens barrel, removes a part of the plurality of optical elements to a position off the optical axis, and moves the removable part of the plurality of lens groups rearward together with at least a part of the remaining part of the plurality of lens groups, which remain on the optical axis, when the lens barrel is moved from the ready-to-photograph state to a fully-retracted state. The drive mechanism moves the insertable/rotatable optical element independently of the removable part of the plurality of lens groups between the inserted position and the removed position in the ready-to-photograph state of the lens barrel, and moves the insertable/rotatable optical element to the removed position and further moves the insertable/rotatable optical element rearward together with the removable part of the plurality of lens groups when the lens barrel changes from the ready-to-photograph state to the fully-retracted state.

It is desirable for the insertable/retractable frame to include a front support plate and a rear support plate which are fixed to each other with the annular holding frame and at least a part of the gear train being held between the front support plate and the rear support plate.

It is desirable for the annular holding frame to include a gear which is formed on an outer edge of the annular holding frame to be engaged with a relay gear of the gear train.

It is desirable for at least one of the front support plate and the rear support plate to include a circular flange positioned between the front support plate and the rear support plate, the annular holding frame being fitted on the circular flange to be freely rotatable relative thereto on an axis of the circular flange.

It is desirable for at least one of the front support plate and the rear support plate to include at least one pin on which at least one gear of the gear train is rotatably fitted.

In an embodiment, a lens barrel is provided, including a plurality of lens groups arranged on an optical axis; a specific-effect optical element which can be rotated on an axis thereof and can be inserted into and removed from an optical path on the optical axis; and a drive mechanism including a motor which inserts and removes the specific-effect optical element into and from the optical path to be positioned on and off the optical axis by forward and reverse rotations of the motor, respectively. The drive mechanism rotates the specific-effect optical element on the optical axis while holding the specific-effect optical element in the optical path by the forward rotation of the motor when the specific-effect optical element is positioned on the optical axis.

According to the present invention, both the operations for inserting and removing the insertable/rotatable optical element into and from an optical path on the photographing optical axis and the operation for rotating the insertable/rotatable optical element on the photographing optical axis can be carried out by a common motor, which makes it possible to simplify and miniaturize the drive mechanism for the insertable/rotatable optical element.

The present disclosure relates to subject matter contained in Japanese Patent Application No. 2005-161915 (filed on Jun. 1, 2005) which is expressly incorporated herein by reference in its entirety.

BRIEF DESCRIPTION OF THE DRAWINGS

The present invention will be described below in detail with reference to the accompanying drawings in which:

FIG. 12 is a developed view of the stationary barrel shown in FIG. 11;

FIG. 13 is a developed view of a helicoid ring shown in FIG. 11;

FIG. 14 is a developed view of the third external barrel shown in FIG. 11;

FIG. 15 is a developed view of a first linear guide ring shown in FIG. 11;

DESCRIPTION OF THE PREFERRED EMBODIMENT

Figure 1:
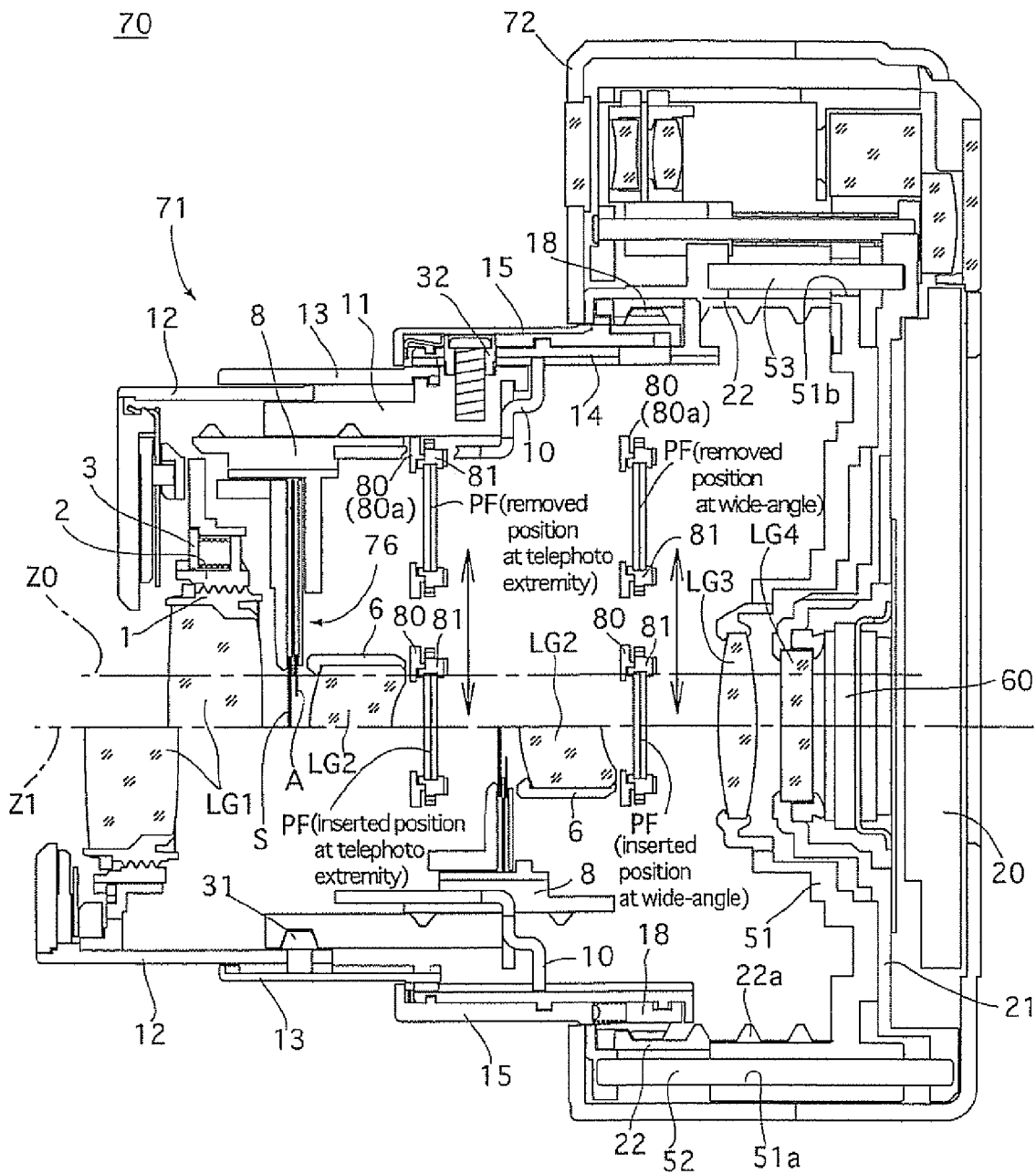
FIG. 1 is a longitudinal sectional view of an embodiment of a digital camera in a ready-to-photograph state thereof, wherein the digital camera includes a retractable zoom lens according to the present invention.
Figure 2:
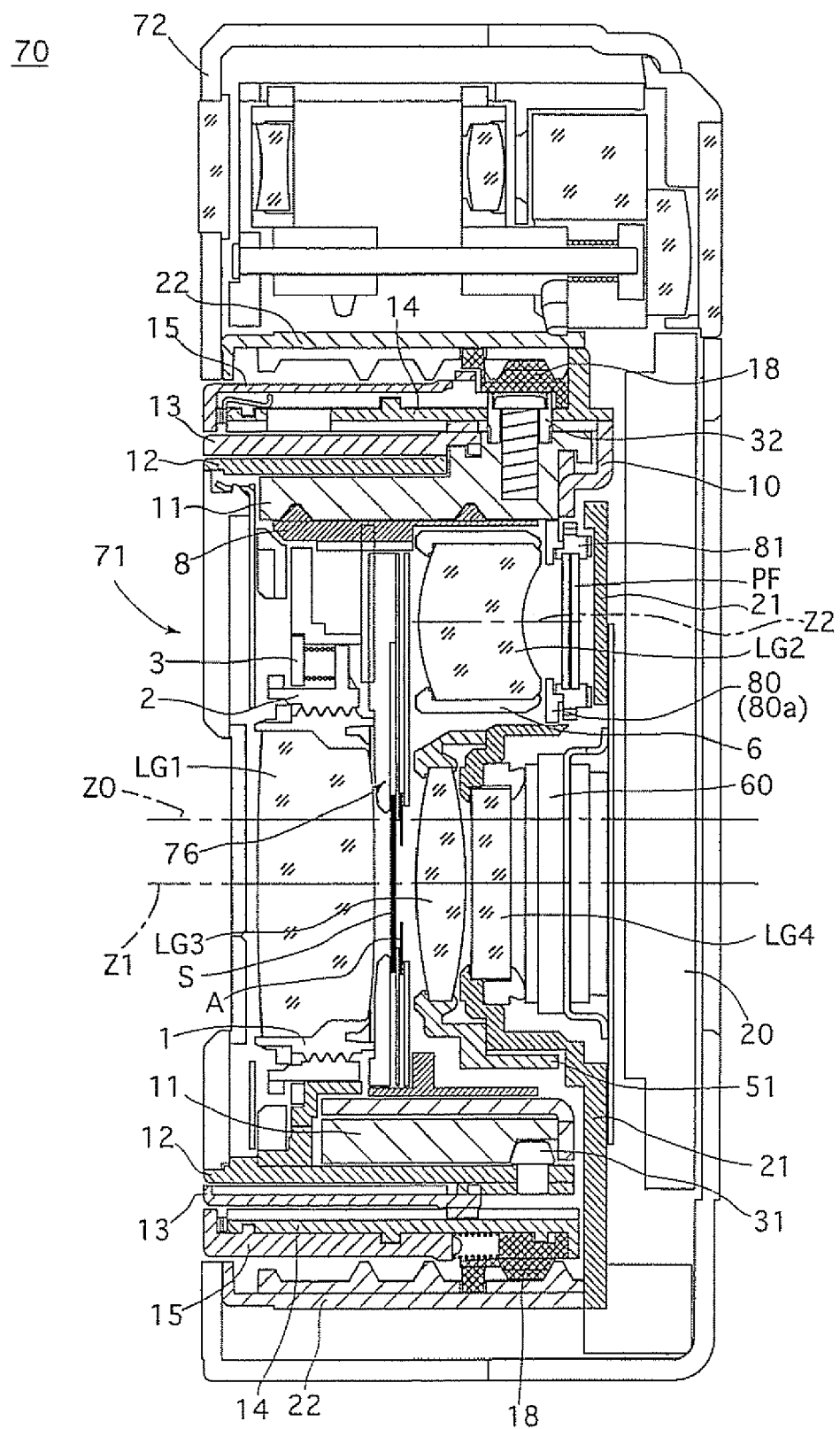
FIG. 2 is a longitudinal sectional view of the digital camera shown in FIG. 1, showing the zoom lens in the fully-retracted state.
Figure 8:
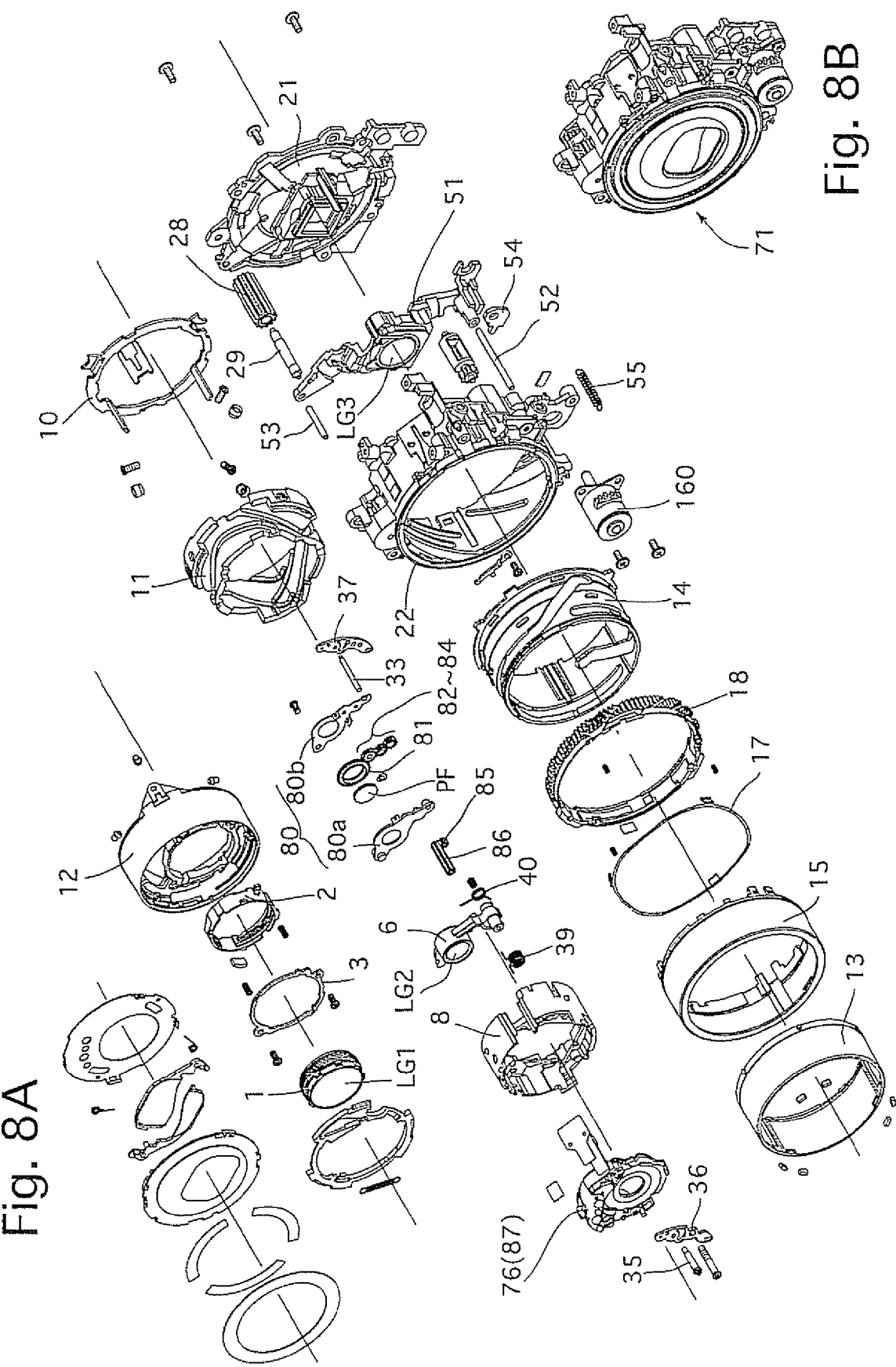
FIG. 8A is an exploded perspective view of elements of the zoom lens shown in FIGS. 1 and 2.
FIG. 8B is a perspective view of the elements of the zoom lens shown in FIG. 8A in an assembled state.

A zoom lens (zoom lens barrel) 71 of a digital camera 70, cross sections of which are shown in FIGS. 1 and 2, is changeable between a ready-to-photograph state shown in FIG. 1, in which the zoom lens 71 has advanced from a camera body 72 toward the object side, and an accommodated state (fully-retracted state) shown in FIG. 2, in which the zoom lens 71 is fully retracted into the camera body 72. In FIG. 1, a cross sectional view of an upper half portion of the zoom lens 71 above a photographing optical axis Z1 thereof shows a state of the zoom lens 71 at the telephoto extremity, while a cross sectional view of a lower half portion of the zoom lens 71 below the photographing optical axis Z1 shows a state of the zoom lens 71 at the wide-angle extremity. As shown in FIG. 8A, the zoom lens 71 is provided with a plurality of concentrically arranged ring members (cylindrical members): a second linear guide ring (second-lens-group linear guide ring) 10, a cam ring 11, a first external barrel 12, a second external barrel 13, a first linear guide ring 14, a third external barrel 15, a helicoid ring 18 and a stationary barrel 22 which are substantially concentrically arranged about a common axis that is shown as a lens barrel axis Z0 shown in FIGS. 1 and 2.

The zoom lens 71 is provided with a photographing optical system including a first lens group LG1, a shutter S, an adjustable diaphragm A, a second lens group LG2, a third lens group LG3, a low-pass filter (optical filter) LG4, and a CCD image sensor (solid-state image pick-up device) 60. The zoom lens 71 is further provided with a polarizing filter (insertable/rotatable optical element, specific-effect optical element) PF serving as an insertable optical element which can be inserted into and removed from a photographing optical path between the second lens group LG2 and the third lens group LG3 in a ready-to-photograph state of the zoom lens 71. Optical elements from the first lens group LG1 to the CCD image sensor 60 except the polarizing filter PF serve as standard optical elements (minimum optical elements which are required for imaging object images) which are positioned on the photographing optical axis (common optical axis) Z1 when the zoom lens 71 is in a ready-to-photograph state. The photographing optical axis Z1 is parallel to the lens barrel axis Z0 and positioned below the lens barrel axis Z0. The first lens group LG1 and the second lens group LG2 are moved along the photographing optical axis Z1 in a predetermined moving manner to perform a zooming operation, while the third lens group L3 is moved along the photographing optical axis Z1 to perform a focusing operation. In the following description, the term "optical axis direction" refers to a direction parallel to the photographing optical axis Z1. Additionally, in the following description, the term "forward/rearward direction" refers to a direction along the photographing optical axis Z1; the forward direction (the left side as viewed in FIG. 1) and the rearward direction (the right side as viewed in FIG. 1) are defined as being toward the object side and toward the image side, respectively.

As shown in FIGS. 1 and 2, the stationary barrel 22 is positioned in the camera body 72 and fixed to the camera body 72, while a CCD holder 21 is fixed to a rear portion of the stationary barrel 22. The CCD image sensor 60 and the low-pass filter LG4 are supported by the CCD holder 21 thereon. The camera 70 is provided behind the CCD holder 21 with an LCD panel 20 which indicates visual images and various photographic information.

Figure 11:
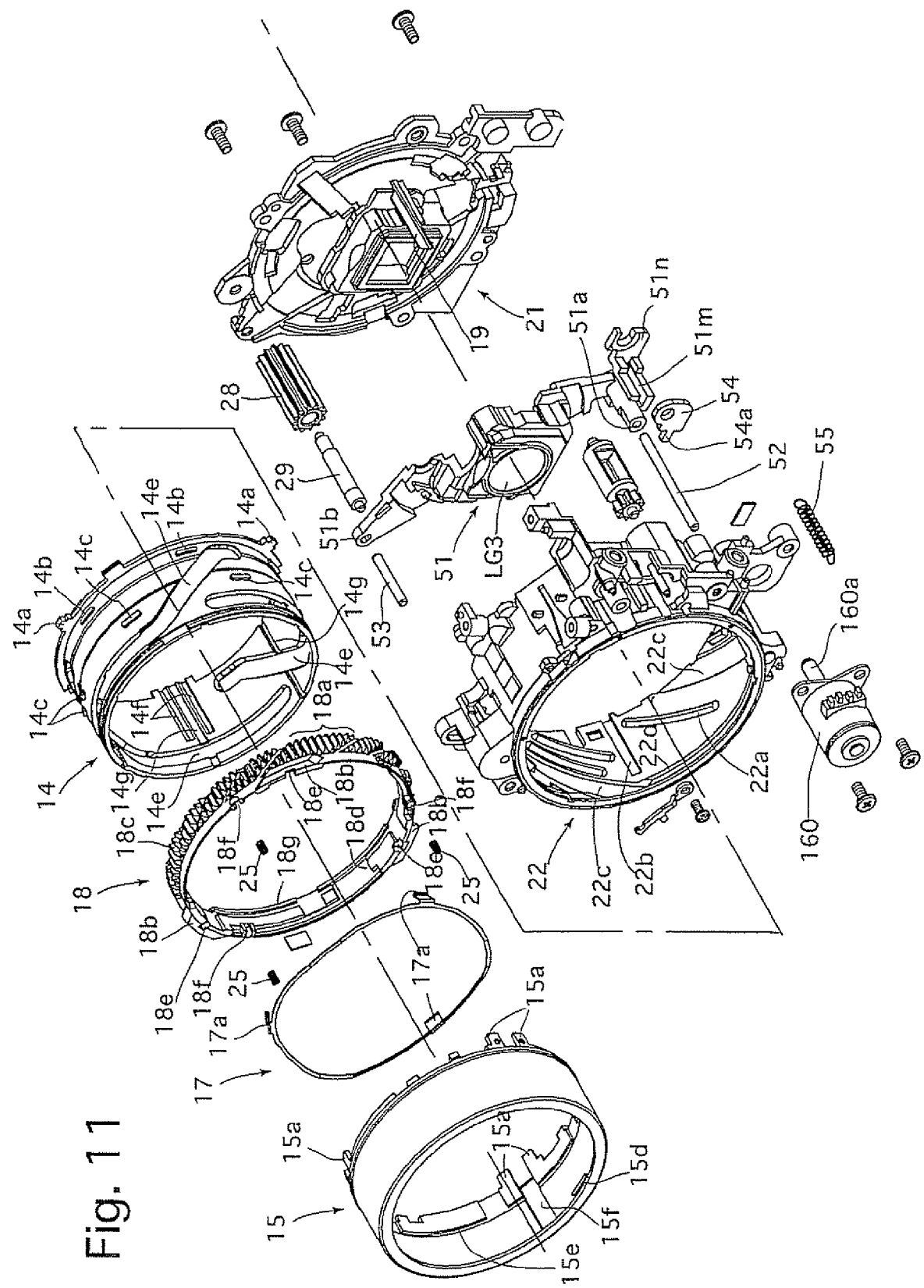
FIG. 11 is an exploded perspective view of portions of the zoom lens shown in FIG. 8A, showing elements of an advancing/retracting mechanism of the zoom lens from a stationary barrel to a third external barrel.

The zoom lens 71 is provided in the stationary barrel 22 with an AF lens frame (third lens frame which supports and holds the third lens group LG3) 51. The zoom lens 71 is provided between the CCD holder 21 and the stationary barrel 22 with an AF guide shaft 52 and a rotation preventive shaft 53 which extend parallel to the photographing optical axis Z1 to guide the AF lens frame 51 in the optical axis direction without rotating the AF lens frame 51 about the lens barrel axis Z0. Front and rear ends of each of the AF guide shaft 52 and the rotation preventive shaft 53 are fixed to the stationary barrel 22 and the CCD holder 21, respectively. The AF lens frame 51 is provided on radially opposite sides thereof with a pair of guide holes 51a and 51b in which the AF guide shaft 52 and the rotation preventive shaft 53 are respectively fitted so that the AF lens frame 51 is slidable on the AF guide shaft 52 and the rotation preventive shaft 53. As shown in FIG. 11, the camera 70 is provided with an AF motor 160 having a rotary drive shaft 160a which is threaded to serve as a feed screw shaft, and the rotary drive shaft 160a is screwed through a screw hole formed on an AF nut 54. The AF nut 54 is provided with a rotation-preventing protrusion 54a. The AF lens frame 51 is provided with a guide groove 51m, extending in a direction parallel to the optical axis Z1, in which the rotation-preventing protrusion 54a is slidably fitted. Furthermore, the AF lens frame 51 is provided with a stopper protrusion 51n which is positioned behind the AF nut 54. The AF lens frame 51 is biased forward in the optical axis direction by an extension coil spring 55 serving as a biasing member, and the forward movement limit of the AF lens frame 51 is determined via engagement between the stopper protrusion 51n and the AF nut 54. If the AF nut 54 is moved rearward by a rotation of the rotary drive shaft 160a, the AF lens frame 51 is pressed by the AF nut 54 to move rearward. Conversely, if the AF nut 54 is moved forward, the AF tens frame 51 follows the AF nut 54 to move forward by the biasing force of the extension coil spring 55. Due to this structure, the AF lens frame 51 can be moved forward and rearward in the optical axis direction.

Figure 7:
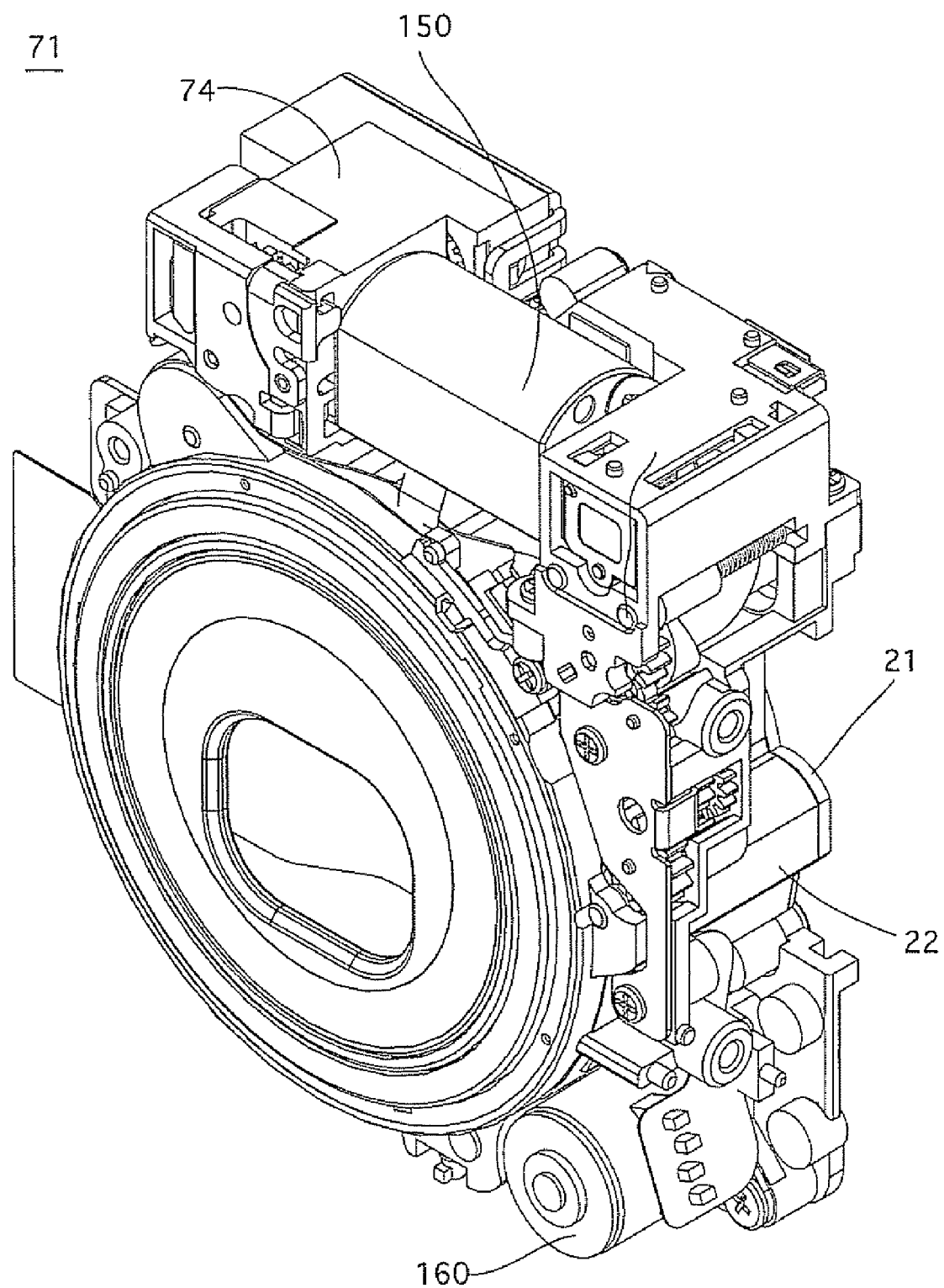
FIG. 7 is a perspective view of the zoom lens (the entire retractable zoom lens unit) in the same state as that shown in FIG. 2.

As shown in FIG. 7, the camera 70 is provided above the stationary barrel 22 with a zoom motor 150 and a reduction gear train box 74 which are mounted on the stationary barrel 22. The reduction gear train box 74 contains a reduction gear train for transferring rotation of the zoom motor 150 to a zoom gear 28 (see FIGS. 8A, 8B and 11 through 13). The zoom gear 28 is rotatably fitted on a zoom gear shaft 29 extending parallel to the photographing optical axis Z1. Front and rear ends of the zoom gear shaft 29 are fixed to the stationary barrel 22 and the CCD holder 21, respectively.

As shown in FIGS. 11 and 12, the stationary barrel 22 is provided on an inner peripheral surface thereof with a female helicoid 22a, a set of three linear guide grooves 22b, a set of three inclined grooves 22c, and a set of three rotational sliding grooves 22d. Threads of the female helicoid 22a extend in a direction inclined with respect to both the optical axis direction and a circumferential direction of the stationary barrel 22. The set of three linear guide grooves 22b extend parallel to the photographing optical axis Z1. The set of three inclined grooves 22c extend parallel to the female helicoid 22a. The set of three rotational sliding grooves 22d are formed in the vicinity of a front end of the inner peripheral surface of the stationary barrel 22 to extend along a circumferential direction of the stationary barrel 22 to communicate the front ends of the set of three inclined grooves 22c, respectively. The female helicoid 22a is not formed on the specific front area (non-helicoid area 22z; see FIG. 12) of the inner peripheral surface of the stationary barrel 22 which is positioned on a front part of the inner peripheral surface of the stationary barrel 22 immediately behind the set of three rotational sliding grooves 22d.

As shown in FIGS. 11 and 13, the helicoid ring 18 is provided on an outer peripheral surface thereof with a male helicoid 18a and a set of three rotational sliding projections 1b. The male helicoid 18a is engaged with the female helicoid 22a, and the set of three rotational sliding projections 18b are engaged in the set of three inclined grooves 22c or the set of three rotational sliding grooves 22d, respectively. The helicoid ring 18 is provided on the threads of the male helicoid 18a with an annular gear 18c which is in mesh with the zoom gear 28. Therefore, when a rotation of the zoom gear 28 is transferred to the annular gear 18c, the helicoid ring 18 moves forward or rearward in the optical axis direction while rotating about the lens barrel axis Z0 within a predetermined range in which the male helicoid 18a remains in mesh with the female helicoid 22a. A forward movement of the helicoid ring 18 beyond a predetermined point with respect to the stationary barrel 22 causes the male helicoid 18a to be disengaged from the female helicoid 22a so that the helicoid ring 18 rotates about the lens barrel axis Z0 without moving in the optical axis direction relative to the stationary barrel 22 by the engagement of the set of three rotational sliding projections 18b with the set of three rotational sliding grooves 22d. The set of three inclined grooves 22c are formed on the stationary barrel 22 to prevent the set of three rotational sliding projections 18b and the stationary barrel 22 from interfering with each other when the female helicoid 22a and the male helicoid 18a are engaged with each other.

The helicoid ring 18 is provided, on an inner peripheral surface thereof at three different circumferential positions on the helicoid ring 18, with three rotation transfer recesses 18d (see FIG. 11; only one of them is shown in FIG. 11) front ends of which are open at the front end of the helicoid ring 18, and the third external barrel 15 is provided, at corresponding three different circumferential positions on the third external barrel 15, with three pairs of rotation transfer projections 15a (see FIGS. 11 and 14) which project rearward from the rear end of the third external barrel 15 to be inserted into the three rotation transfer recesses 18d from the front thereof, respectively. The three pairs of rotation transfer projections 15a and the three rotation transfer recesses 18d are slidingly movable relative to each other in a direction of the lens barrel axis Z0, and are not rotatable relative to each other about the lens barrel axis Z0. Namely, the helicoid ring 18 and the third external barrel 15 integrally rotate. The helicoid ring 18 is provided, on front faces of the three rotational sliding projections 18b at three different circumferential positions on the helicoid ring 18, with a set of three engaging recesses 18e which are formed on an inner peripheral surface of the helicoid ring 18 to be open at the front end of the helicoid ring 18. The third external barrel 15 is provided, at corresponding three different circumferential positions on the third external barrel 15, with a set of three engaging projections 15b which project rearward from the rear end of the third external barrel 15, and also project radially outwards, to be engaged in the set of three engaging recesses 18e from the front thereof, respectively. The set of three engaging projections 15b, which are respectively engaged in the set of three engaging recesses 18e, are also simultaneously engaged in the set of three rotational sliding grooves 22d, respectively, when the set of three rotational sliding projections 18b are engaged in the set of three rotational sliding grooves 22d (see FIG. 3).

The zoom lens 71 is provided between the third external barrel 15 and the helicoid ring 18 with three compression coil springs 25 (see FIGS. 4, 6, 11 and 13) which bias the third external barrel 15 and the helicoid ring 18 in opposite directions away from each other in the optical axis direction. The rear ends of the three compression coil springs 25 are respectively inserted into three spring support holes (insertion recess) 18f which are formed on the front end of the helicoid ring 18, and the front ends of the three compression coil springs 25 are respectively in pressing contact with three engaging recesses 15c (see FIG. 14) formed at the rear end of the third external barrel 15. Therefore, the set of three engaging projections 15b of the third external barrel 15 are respectively pressed against front guide surfaces of the rotational sliding grooves 22d by the spring force of the three compression coil springs 25. At the same time, the set of three rotational sliding projections 18b of the helicoid ring 18 are respectively pressed against rear guide surfaces of the rotational sliding grooves 22d by the spring force of the three compression coil springs 25.

As shown in FIGS. 11 and 14, the third external barrel 15 is provided on an inner peripheral surface thereof with a plurality of relative rotation guide projections 15d which are formed at different circumferential positions on the third external barrel 15, a circumferential groove 15e which extends in a circumferential direction about the lens barrel axis Z0, and a set of three rotation transfer grooves 15f which extend parallel to the lens barrel axis Z0. The plurality of relative rotation guide projections 15d are elongated in a circumferential direction of the third external barrel to lie in a plane orthogonal to the lens barrel axis Z0. As can be seen in FIG. 14, each rotation transfer groove 15f intersects the circumferential groove 15e at right angles. The circumferential positions of the three rotation transfer grooves 15f are formed to correspond to those of the three pairs of rotation transfer projections 15a, respectively. Each rotation transfer groove 15f is open at the rear end of the third external barrel 15. The helicoid ring 18 is provided on an inner peripheral surface thereof with a circumferential groove 18g which extends in a circumferential direction about the lens barrel axis Z0 (see FIGS. 4, 6 and 11). The first linear guide ring 14 is positioned inside of a combination of the third external barrel 15 and the helicoid ring 18 to be supported thereby. The first linear guide ring 14 is provided on an outer peripheral surface thereof with a set of three linear guide projections 14a, a first plurality of relative rotation guide projections 14b, a second plurality of relative rotation guide projections 14c, and a circumferential groove 14d, in that order from rear to front of the first linear guide ring 14 in the optical axis direction (see FIGS. 3 through 6, 11 and 15). The set of three linear guide projections 14a project radially outwards in the vicinity of the rear end of the first linear guide ring 14. The first plurality of relative rotation guide projections 14b project radially outwards at different circumferential positions on the first linear guide ring 14, and are each elongated in a circumferential direction of the first linear guide ring 14 to lie in a plane orthogonal to the lens barrel axis Z0. Likewise, the second plurality of relative rotation guide projections 14c project at different circumferential positions on the first linear guide ring 14, and are each elongated in a circumferential direction of the first linear guide ring 14 to lie in a plane orthogonal to the lens barrel axis Z0. The circumferential groove 14d is an annular groove centered on the lens barrel axis Z0. The first linear guide ring 14 is guided in the optical axis direction with respect to the stationary barrel 22 by the engagement of the set of three linear guide projections 14a with the set of three linear guide grooves 22b, respectively. The third external barrel 15 is coupled to the first linear guide ring 14 to be rotatable about the lens barrel axis Z0 relative to the first linear guide ring 14 by both the engagement of the second plurality of relative rotation guide projections 14c with the circumferential groove 15e and the engagement of the plurality of relative rotation guide projections 15d with the circumferential groove 14d. The second plurality of relative rotation guide projections 14c and the circumferential groove 15e are loosely engaged with each other to be slightly movable relative to each other in the optical axis direction. Likewise, the plurality of relative rotation guide projections 15d and the circumferential groove 14d are loosely engaged with each other to be slightly movable relative to each other in the optical axis direction. The helicoid ring 18 is coupled to the first linear guide ring 14 to be rotatable about the lens barrel axis Z0 relative to the first linear guide ring 14 by the engagement of the first plurality of relative rotation guide projections 14b with the circumferential groove 18g. The first plurality of relative rotation guide projections 14b and the circumferential groove 18g are loosely engaged with each other to be slightly movable relative to each other in the optical axis direction.

The first linear guide ring 14 is provided with a set of three through-slots 14e which radially extend through the first linear guide ring 14. As shown in FIG. 15, each through-slot 14e includes a front circumferential slot portion 14e-1, a rear circumferential slot portion 14e-2, and an inclined lead slot portion 14e-3 which connects the front circumferential slot portion 14e-1 with the rear circumferential slot portion 14e-2. The front circumferential slot portion 14e-1 and the rear circumferential slot portion 14e-2 extend parallel to each other in a circumferential direction of the first linear guide ring 14. A set of three roller followers 32 fixed to an outer peripheral surface of the cam ring 11 at different circumferential positions thereon are engaged in the set of three through-slots 14e, respectively. Each roller follower 32 is fixed to the cam ring 11 by set screw 32a. The set of three roller followers 32 are further engaged in the set of three rotation transfer grooves 15f through the set of three through-slots 14e, respectively. The zoom lens 71 is provided between the first linear guide ring 14 and the third external barrel 15 with a follower-biasing ring spring 17. A set of three follower pressing protrusions 17a protrude rearward from the follower-biasing ring spring 17 to be engaged in front portions of the set of three rotation transfer grooves 15f, respectively (see FIG. 14). The set of three follower pressing protrusions 17a press the set of three roller followers 32 rearward to remove backlash between the set of three roller followers 32 and the set of three through-slots 14e (the front circumferential slot portions 14e-1) when the set of three roller followers 32 are engaged in the front circumferential slot portions 14e-1 of the set of three through-slots 14e, respectively (see FIG. 3).

Advancing operations of movable elements of the zoom lens 71 from the stationary barrel 22 to the cam ring 11 will be discussed hereinafter with reference to the above described structure of the digital camera 70. In the state shown in FIGS. 2, 5 and 6 in which the zoom lens 71 is in the fully-retracted state, rotating the zoom gear 28 in a lens barrel advancing direction by the zoom motor 150 causes the helicoid ring 18 to move forward while rotating about the lens barrel axis Z0 due to the engagement of the female helicoid 22a with the male helicoid 18a. This rotation of the helicoid ring 18 causes the third external barrel 15 to move forward together with the helicoid ring 18 while rotating about the lens barrel axis Z0 together with the helicoid ring 18, and further causes the first linear guide ring 14 to move forward together with the helicoid ring 18 and the third external barrel 15 because each of the helicoid ring 18 and the third external barrel 15 is coupled to the first linear guide ring 14 to make respective relative rotations between the third external barrel 15 and the first linear guide ring 14 and between the helicoid ring 18 and the first linear guide ring 14 possible and to be movable together along a direction of a common rotational axis (i.e., the lens barrel axis Z0) due to the engagement of the first plurality of relative rotation guide projections 14b with the circumferential groove 18g, the engagement of the second plurality of relative rotation guide projections 14c with the circumferential groove 15e, and the engagement of the plurality of relative rotation guide projections 15d with the circumferential groove 14d. Rotation of the third external barrel 15 is transferred to the cam ring 11 via the set of three rotation transfer grooves 15f and the set of three roller followers 32, which are engaged in the set of three rotation transfer grooves 15f, respectively. Since the set of three roller followers 32 are also engaged in the set of three through-slots 14e, respectively, the cam ring 11 moves forward while rotating about the lens barrel axis 20 relative to the first linear guide ring 14 in accordance with contours of the lead slot portions 14e-3 of the set of three through-slots 14e. Since the first linear guide ring 14 itself moves forward together with the third lens barrel 15 and the helicoid ring 18 as described above, the cam ring 11 moves forward in the optical axis direction by an amount of movement corresponding to the sum of the amount of the forward movement of the first linear guide ring 14 and the amount of the forward movement of the cam ring 11 by the engagement of the set of three roller followers 32 with the lead slot portions 14e-3 of the set of three through-slots 14e, respectively.

In the above described rotating-advancing operations of the cam ring 11, the third external barrel 15 and the helicoid ring 18 are performed while the set of three rotational sliding projections 18b are moving in the set of three inclined grooves 22c, respectively, only when the male helicoid 18a and the female helicoid 22a are engaged with each other. When the helicoid ring 18 moves forward to the ready-to-photograph position thereof shown in FIGS. 1, 3 and 4, the male helicoid 18a and the female helicoid 22a are disengaged from each other so that the set of three rotational sliding projections 18b move from the set of three inclined grooves 22c to the set of three rotational sliding grooves 22d, respectively. Since the helicoid ring 18 does not move in the optical axis direction relative to the stationary barrel 22 even if rotating upon the disengagement of the male helicoid 18a from the female helicoid 22a, the helicoid ring 18 and the third external barrel 15 rotate at respective axial positions thereof without moving in the optical axis direction due to the engagement of the set of three rotational sliding projections 18b with the set of three rotational sliding grooves 22d Furthermore, at substantially the same time when the set of three rotational sliding projections 18b slide into the set of three rotational sliding grooves 22d from the set of three inclined grooves 22c, respectively, the set of three roller followers 32 enter the front circumferential slot portions 14e-1 of the set of three through-slots 14e, respectively. Thereupon, the cam ring 11 is no longer given any force to also make the cam ring 11 move forward. Consequently, the cam ring 11 only rotates at an axial position in accordance with rotation of the third external barrel 15.

Rotating the zoom gear 28 in a lens barrel retracting direction thereof by the zoom motor 150 causes the aforementioned movable elements of the zoom lens 71 from the stationary barrel 22 to the cam ring 11 to operate in the reverse manner to the above described advancing operations. In this reverse operation, the above described movable elements of the zoom lens 71 retract to their respective retracted positions shown in FIGS. 2, 5 and 6 by rotation of the helicoid ring 18 until the set of three roller followers 32 enter the rear circumferential slot portions 14e-2 of the set of three through-slots 14e, respectively.

The structure of the zoom lens 71 from the cam ring 11 forward will be discussed hereinafter. As shown in FIGS. 11 and 15, the first linear guide ring 14 is provided on an inner peripheral surface thereof with a set of three pairs of first linear guide grooves 14f which are formed at different circumferential positions to extend parallel to the photographing optical axis Z1, and a set of six second linear guide grooves 14g which are formed at different circumferential positions to extend parallel to the photographing optical axis Z1. Each alternate groove of the six second linear guide grooves 14g is positioned in between one pair of first linear guide grooves 14f, i.e., each pair of first linear guide grooves 14f are respectively positioned on the opposite sides of the associated second linear guide groove 14g in a circumferential direction of the first linear guide ring 14. The second linear guide ring 10 is provided on an outer edge thereof with a set of three bifurcated projections 10a (see FIGS. 10 and 20) which project radially outwards from a ring portion 10b of the second linear guide ring 10. Each bifurcated projection 10a is provided at a radially outer end thereof with a pair of radial projections which are respectively engaged in the associated pair of first linear guide grooves 14f. On the other hand, a set of six radial projections 13a (see FIGS. 9 and 18) which are formed on an outer peripheral surface of the second external barrel 13 at a rear end thereof to project radially outwards are engaged in the set of six second linear guide grooves 14g, respectively, to be slidable therealong. Therefore, each of the second external barrel 13 and the second linear guide ring 10 is guided in the optical axis direction via the first linear guide ring 14. The second linear guide ring 10 serves as a linear guide member for guiding a second lens group moving frame 8, which indirectly supports the second lens group LG2, linearly without rotating the second lens group moving frame 8, while the second external barrel 13 serves as a linear guide member for guiding the first external barrel 12, which indirectly supports the first lens group LG1, linearly without rotating the first external barrel 12.

Figure 3:
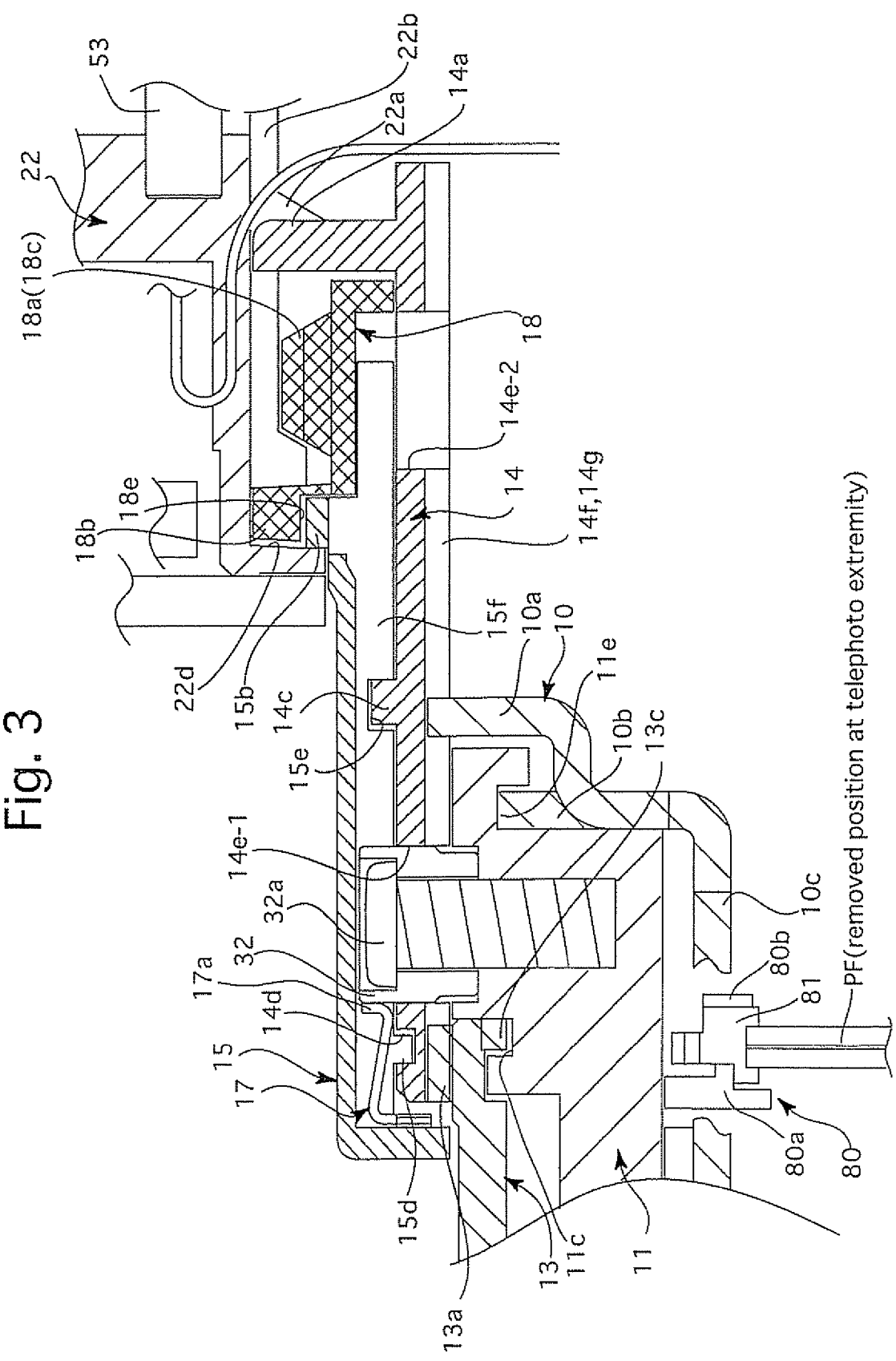
FIG. 3 is an enlarged sectional view of a portion of the zoom lens shown in FIGS. 1 and 2 when the zoom lens is at the telephoto extremity.
Figure 4:
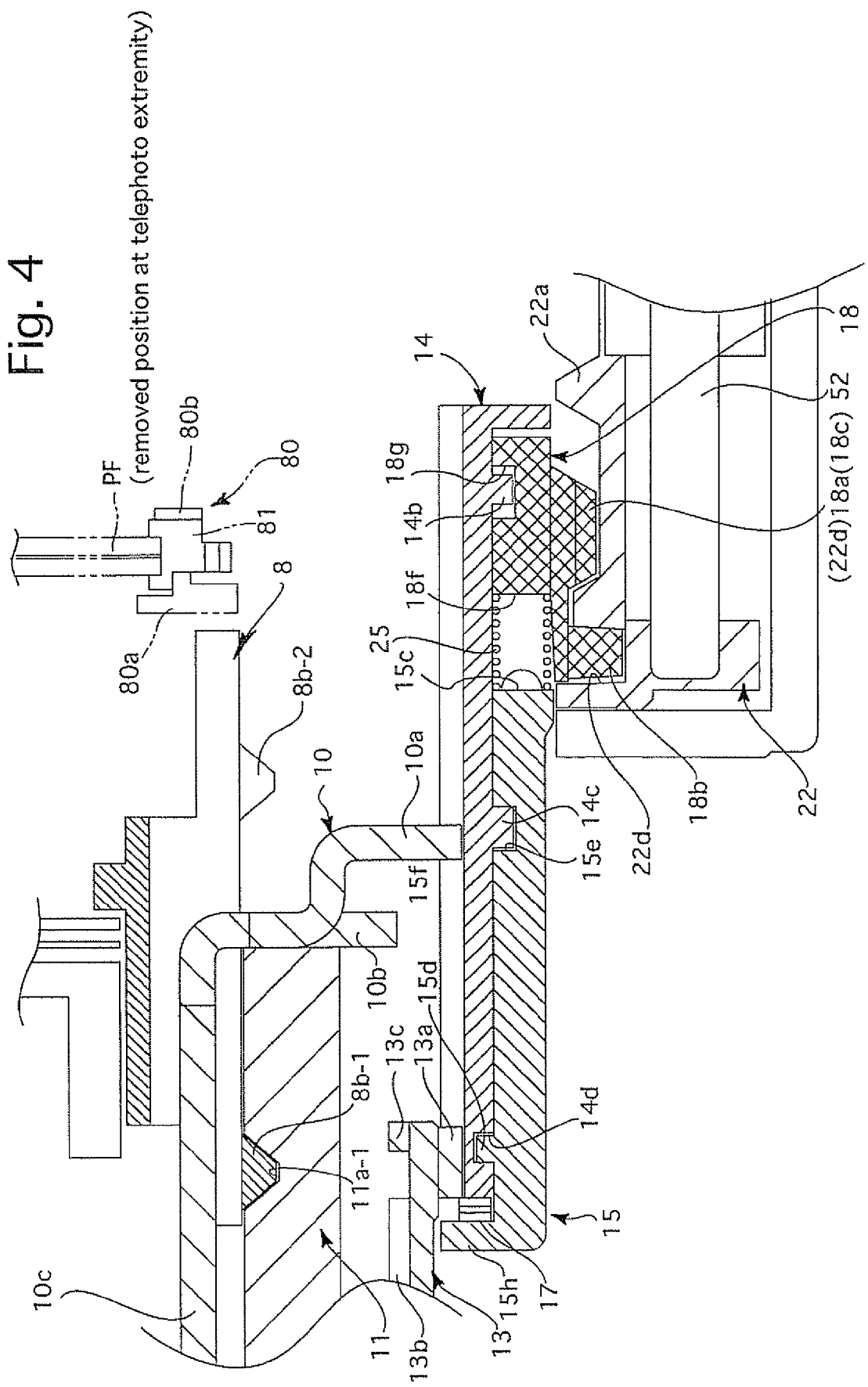
FIG. 4 is an enlarged sectional view of a portion of the zoom lens shown in FIGS. 1 and 2 when the zoom lens is at the wide-angle extremity.
Figure 5:
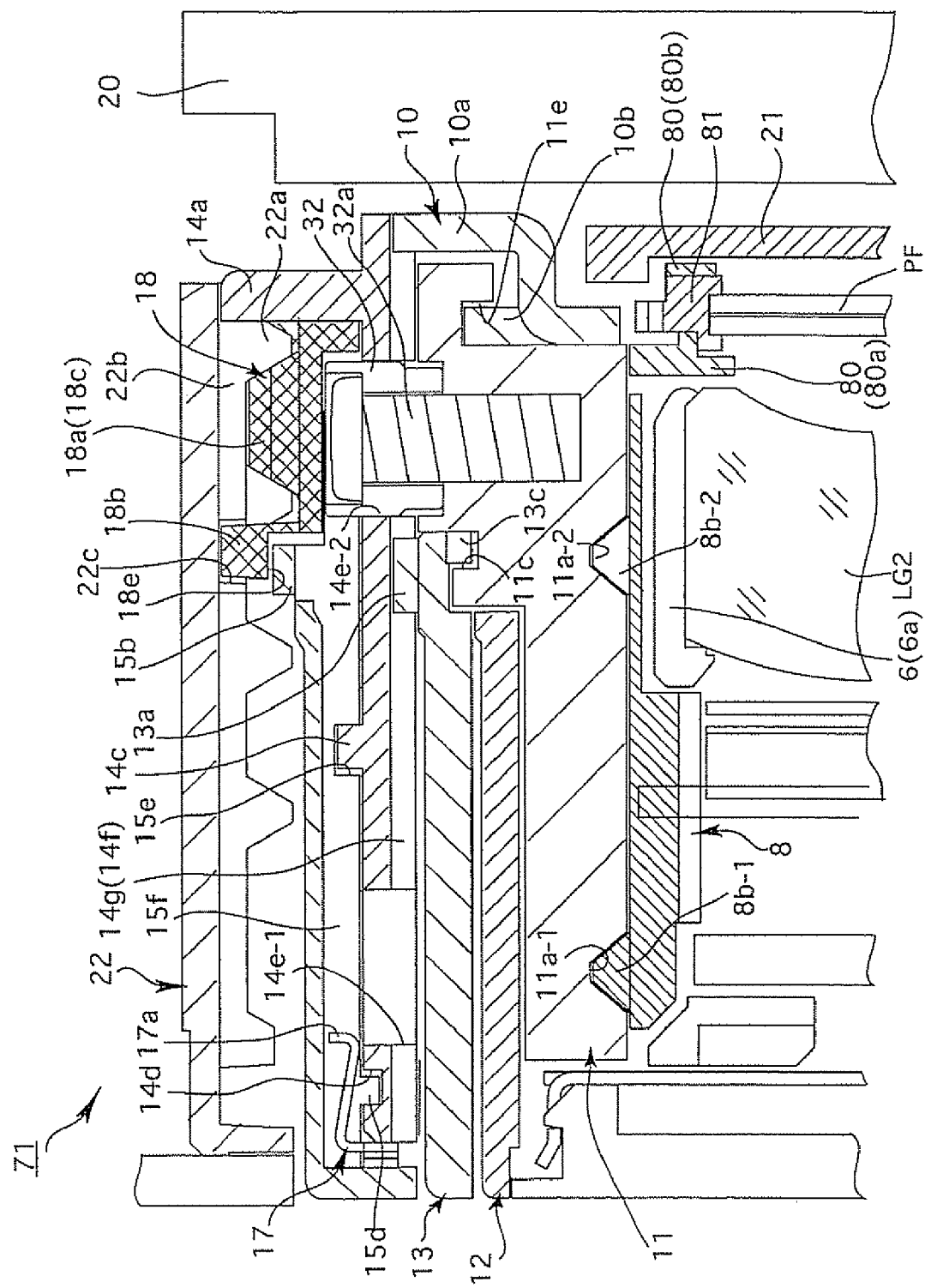
FIG. 5 is an enlarged sectional view of a portion of the zoom lens shown in FIG. 2, in which the zoom lens is in the fully-retracted state.
Figure 6:
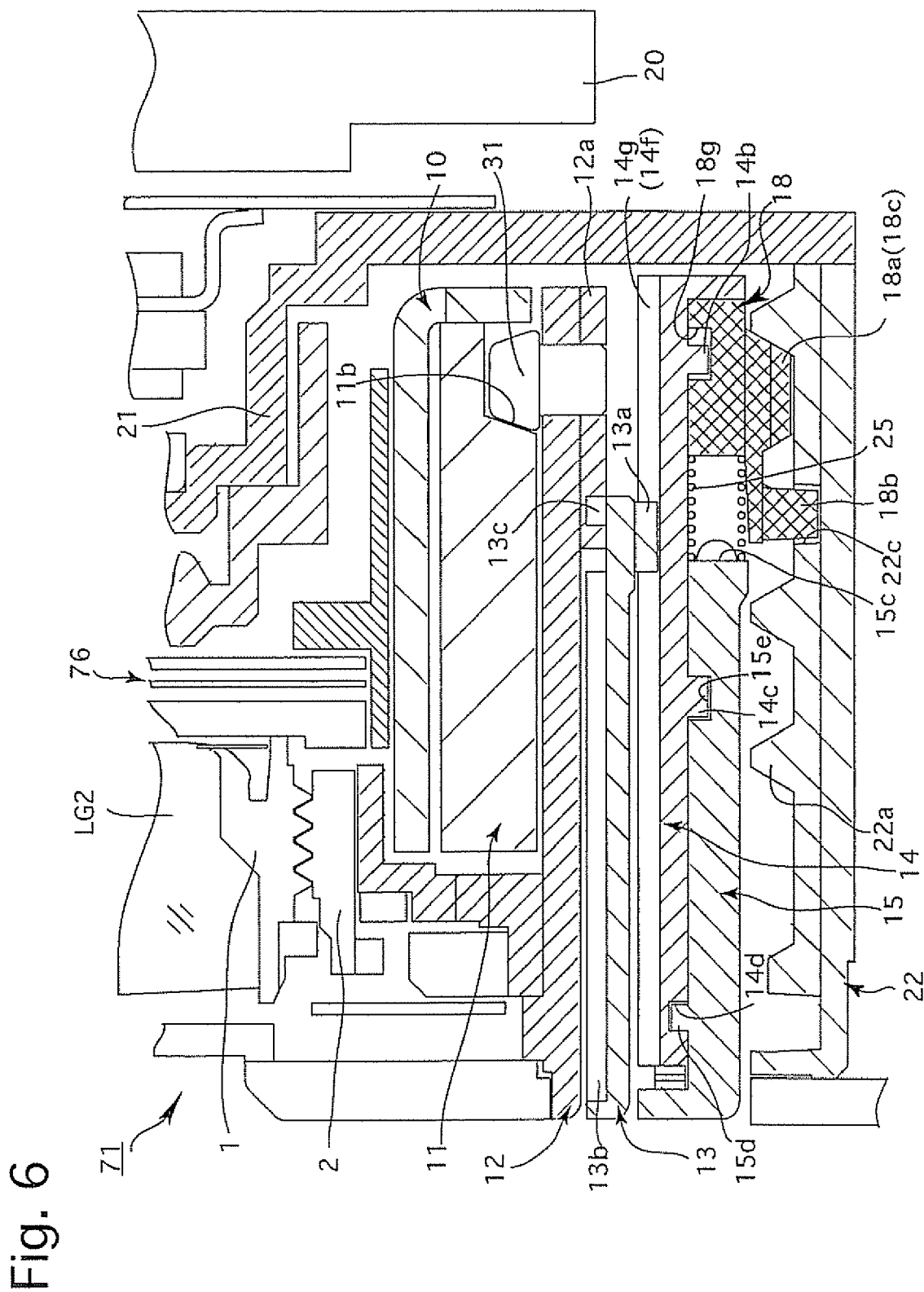
FIG. 6 is an enlarged sectional view of another portion of the zoom lens shown in FIG. 2, in which the zoom lens is in the fully-retracted state.
Figure 10:
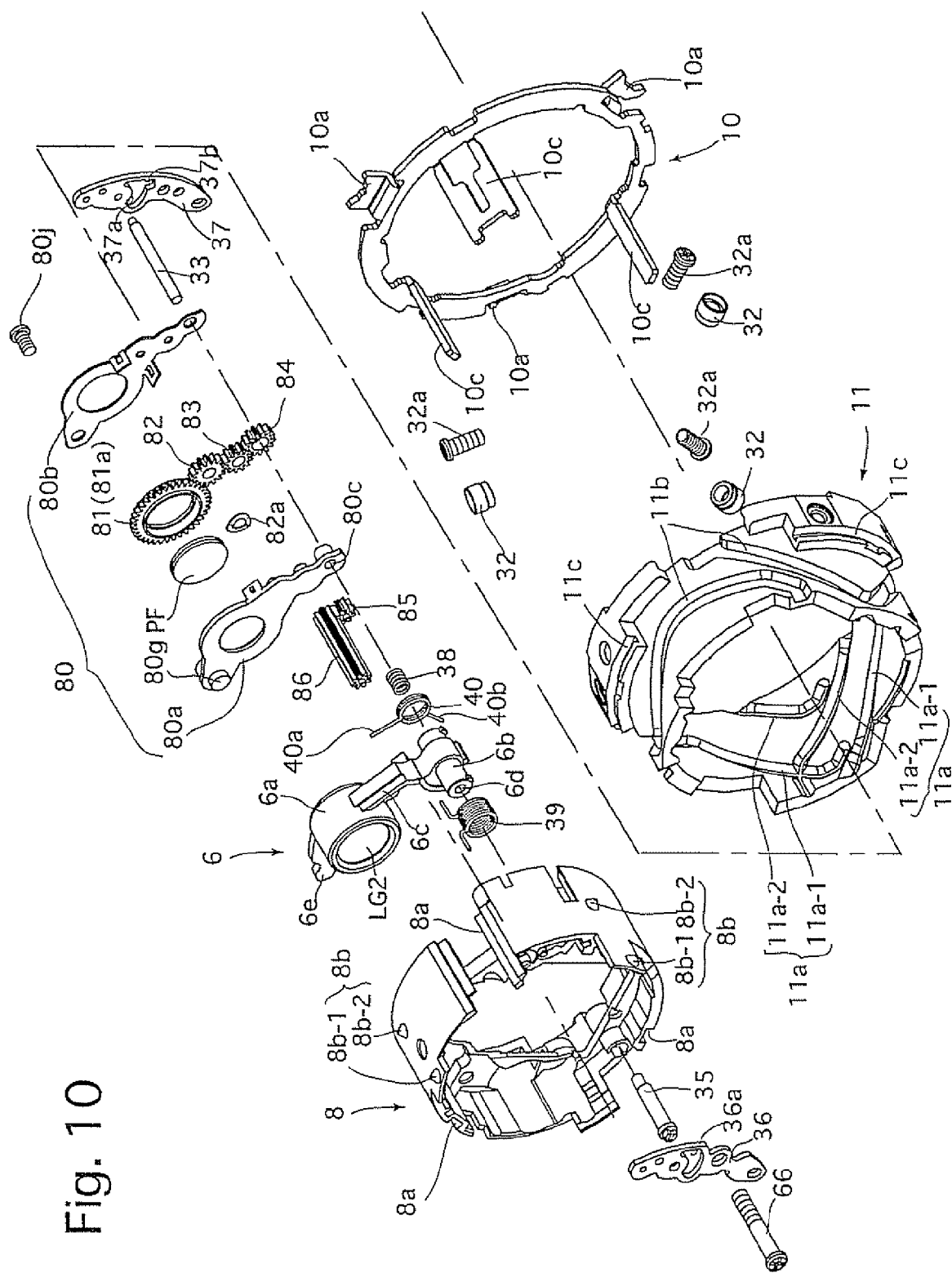
FIG. 10 is an exploded perspective view of portions of the zoom lens shown in FIG. 8A, showing elements of a support mechanism for supporting the second lens group and a polarizing filter of the zoom lens.
Figure 20:
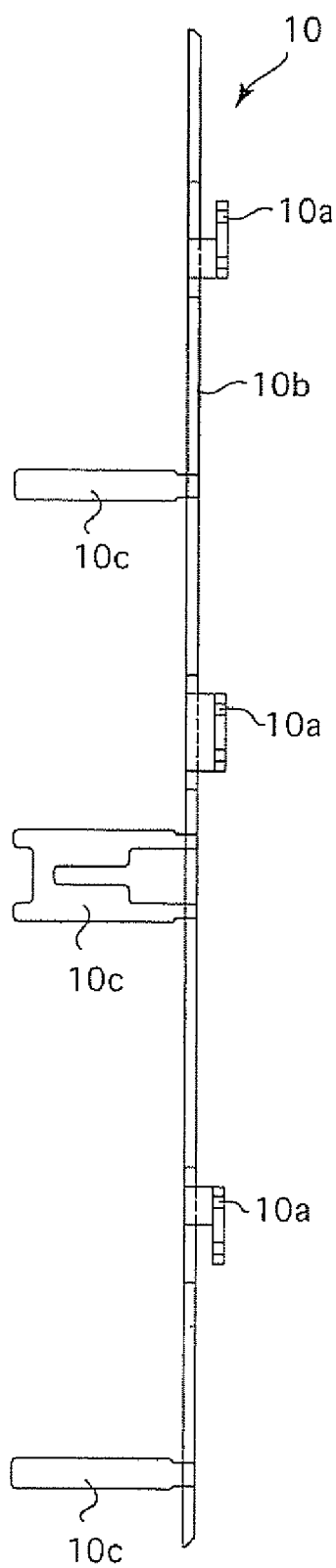
FIG. 20 is a developed view of a second linear guide ring shown in FIG. 10.

As shown in FIGS. 10 and 20, the second linear guide ring 10, that guides the second lens group LG2 linearly, is provided on the ring portion 10b with a set of three linear guide keys 10c which project forward in parallel to one another from the ring portion 10b. The second lens group moving frame 8 is provided with a corresponding set of three guide grooves 8a (see FIGS. 10 and 21) in which the set of three linear guide keys 10c are engaged, respectively. As shown in FIGS. 3 and 5, a discontinuous outer edge of the ring portion 10b is engaged in a discontinuous circumferential groove 11e formed on an inner peripheral surface of the cam ring 11 at the rear end thereof to be rotatable about the lens barrel axis Z0 relative to the cam ring 11 and to be immovable relative to the cam ring 11 in the optical axis direction. The set of three linear guide keys 10c project forward from the ring portion 10b to be positioned inside the cam ring 11. Opposite edges of each linear guide key 10c extending in an axial direction of the second linear guide ring 10 serve as parallel guide edges which are respectively engaged with opposed guide surfaces in the associated guide groove 8a of the second lens group moving frame 8, which is positioned in the cam ring 11 to be supported thereby, to guide the second lens group moving frame 8 linearly in the optical axis direction without rotating the same about the lens barrel axis Z0.

Figure 17:
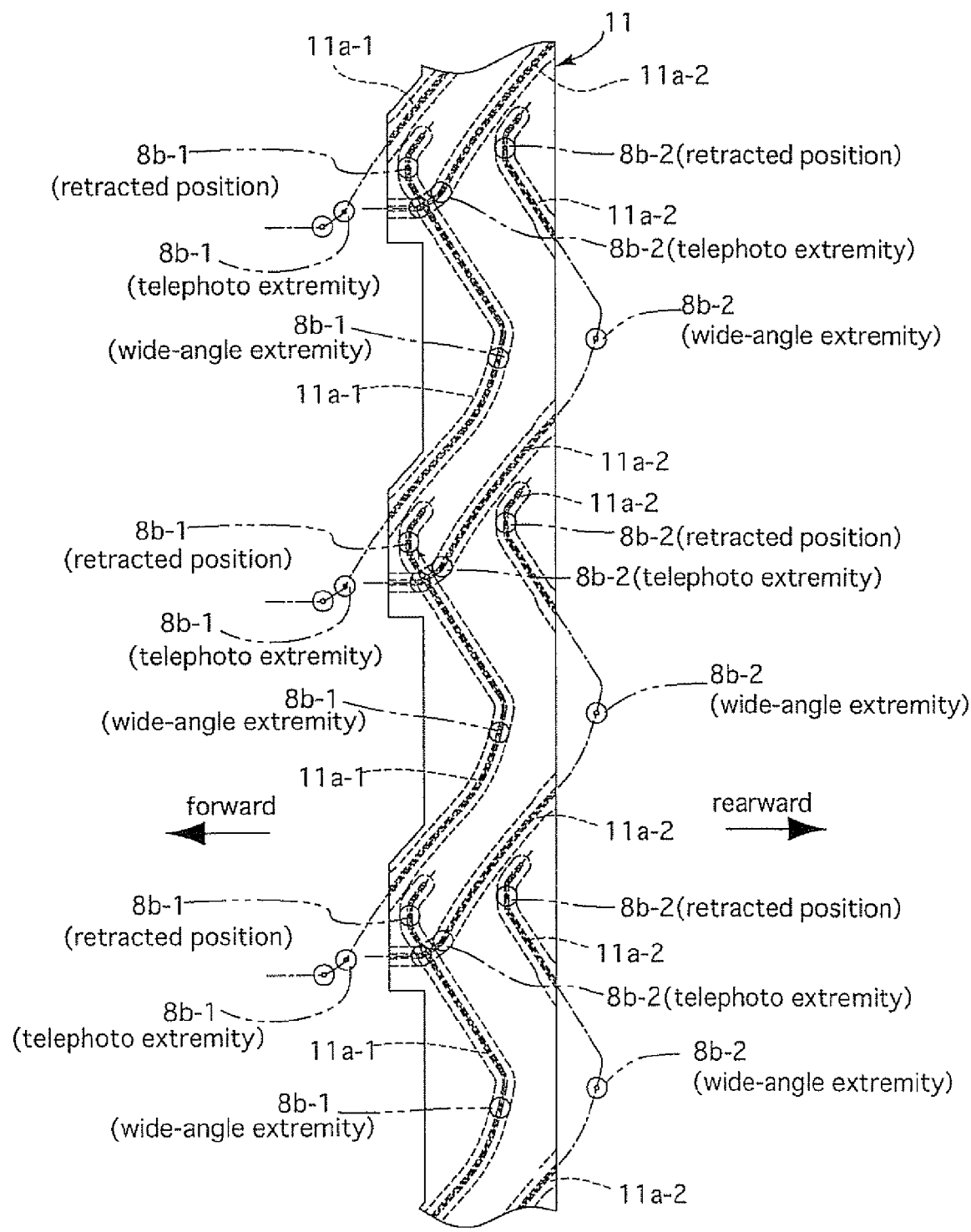
FIG. 17 is a developed view of the cam ring shown in FIG. 10, showing inner cam grooves (for moving the second lens group), formed on the inner peripheral surface of the cam ring, by broken lines.
Figure 21:
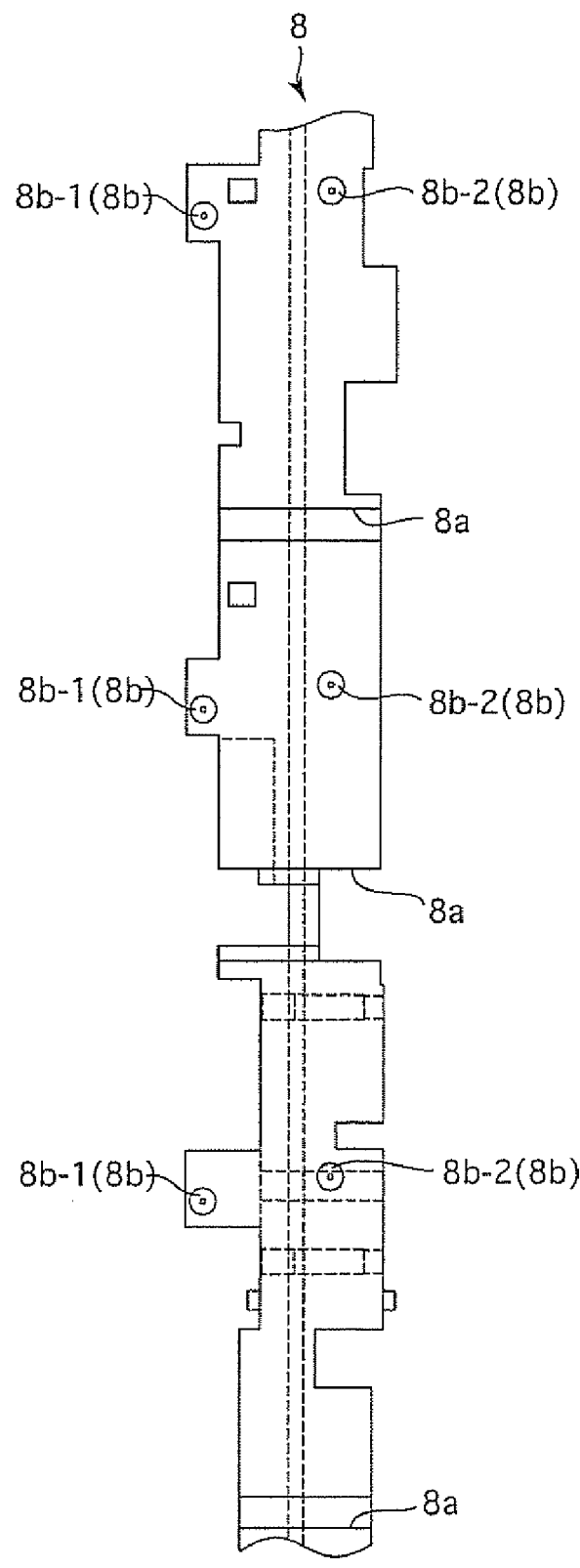
FIG. 21 is a developed view of a second lens group moving frame shown in FIG. 10.

The cam ring 11 is provided on an inner peripheral surface thereof with a plurality of inner cam grooves 11a for moving the second lens group LG2. As shown in FIG. 17, the plurality of inner cam grooves 11a include a set of three front inner cam grooves 11a-1 formed at different circumferential positions, and a set of three rear inner cam grooves 11a-2 formed at different circumferential positions behind the set of three front inner cam grooves 11a-1. Each rear inner cam groove 11a-2 is formed on the cam ring 11 as a discontinuous cam groove (see FIG. 17). The second lens group moving frame 8 is provided on an outer peripheral surface thereof with a plurality of cam followers 8b. As shown in FIG. 21, the plurality of cam followers 8b include a set of three front cam followers 8b-1 which are formed at different circumferential positions to be respectively engaged in the set of three front inner cam grooves 11a-1, and a set of three rear cam followers 8b-2 which are formed at different circumferential positions behind the set of three front cam followers 8b-1 to be respectively engaged in the set of three rear inner cam grooves 11a-2. A rotation of the cam ring 11 causes the second lens group moving frame 8 to move in the optical axis direction in a predetermined moving manner in accordance with contours of the plurality of inner cam grooves 11a since the second lens group moving frame 8 is guided linearly in the optical axis direction without rotating via the second linear guide ring 10.

The zoom lens 71 is provided inside the second lens group moving frame 8 with a second lens frame 6 which supports and holds the second lens group LG2. As shown in FIG. 10, the second lens frame 6 is provided with a cylindrical lens holder portion 6a, a pivoted cylindrical portion 6b, a swing arm portion 6c and an engaging protrusion (stop protrusion) 6e. The cylindrical lens holder portion 6a directly holds and supports the second lens group L2. The pivoted cylindrical portion 6b is provided on the axis thereof with a through-hole 6d which extends in a direction parallel to the optical axis of the second lens group LG2. The swing arm portion 6c extends in a radial direction of the cylindrical lens holder portion 6a to connect the cylindrical lens holder portion 6a to the pivoted cylindrical portion 6b. The engaging protrusion 6e is formed on the cylindrical lens holder portion 6a to extend radially outwards in a direction away from the swing arm portion 6c. The engaging protrusion 6e is provided on a rear surface thereof with a stop projection 6f (see FIGS. 25, 26, 33 and 34). The cylindrical lens holder portion 6a and the pivoted cylindrical portion 6b of the second lens frame 6 are cylindrical members, the axes of which are parallel to each other and also parallel to the photographing optical axis Z1. In the through-hole 6d of the pivoted cylindrical portion 6b, a pivot shaft 33 is fitted so that the second lens frame 6 can rotate about the pivot shaft 33. The front and rear ends of the pivot shaft 33 are supported by front and rear second lens frame support plates (a pair of second lens frame support plates) 36 and 37, respectively. The pair of second lens frame support plates 36 and 37 are fixed to the second lens group moving frame 8 by a set screw 66. Accordingly, the second lens frame 6 is supported by the second lens group moving frame 8 to be rotatable (swingable) about the pivot shaft 33. The pivot shaft 33 is a predetermined distance away from the photographing optical axis Z1 and extends parallel to the photographing optical axis Z1. The second lens frame 6 is swingable about the pivot shaft 33 between a photographing position (shown in FIGS. 1, 25 through 28, 33 and 34) where the optical axis of the second lens group LG2 coincides with the photographing optical axis Z1 and a radially retracted position (shown in FIGS. 2, 29 and 30) where the optical axis of the second lens group LG2 is retracted away from the photographing optical axis Z1 to be eccentric from the photographing optical axis Z1. As shown in FIGS. 25 through 30, a rotation limit shaft (an element of a drive controller/a rotation limit member) 35 which determines the aforementioned photographing position of the second lens frame 6 by making contact with the engaging protrusion 6e is mounted to the second lens group moving frame 8. A second lens frame returning spring (front torsion coil spring) 39 (see FIG. 10) is fitted on a front portion of the pivoted cylindrical portion 6b to bias the second lens frame 6 to rotate in a direction to bring the engaging protrusion 6e to come into contact with the rotation limit shaft 35, i.e., in a direction toward the aforementioned photographing position of the second lens frame 6. An axial-direction biasing spring 38 made of a compression coil spring is fitted on the pivot shaft 33 to press the pivoted cylindrical portion 6b forward in the optical axis direction (toward the rear second lens frame support plate 36) to thereby remove backlash of the second lens frame 6 relative to the second lens group moving frame 8 in the optical axis direction.

The second lens frame 6 moves together with the second lens group moving frame 8 in the optical axis direction. The CCD holder 21 is provided on a front surface thereof with a position-control cam bar 19 (see FIG. 11) which projects forward from the CCD holder 21 to be engageable with the second lens frame 6. If the second lens group moving frame B moves rearward in a retracting direction to approach the CCD holder 21, the position-control cam bar 19 comes into pressing contact with the second lens frame 6 to rotate the second lens frame 6 to the radially retracted position thereof against the biasing force of the second lens frame returning spring 39 (see FIGS. 29 and 30).

More specifically, as shown in FIGS. 25 through 30, the position-control cam bar 19 is provided at a front end thereof with a retracting cam surface 19a which is inclined with respect to the optical axis direction, and is further provided, along an inner side edge of the position-control cam bar 19 that is communicably connected with the retracting cam surface 19a, with a radially-retracted-position holding surface 19b which extends rearward from the retracting cam surface 19a in the optical axis direction. The position-control cam bar 19 is in the shape of a partial cylinder having its axis on the axis of the pivot shaft 33, thus having a curved shape in cross section. The retracting cam surface 19a is formed on an end surface of the partial cylinder as a lead surface. The retracting cam surface 19a is formed as an inclined surface which is inclined forward in a direction away from the photographing optical axis Z1. The position-control cam bar 19 is provided on a lower surface (convex surface) thereof with a guide key 19c which is elongated in the optical axis direction. The front and rear second lens frame support plates 36 and 37 are provided with a cam-bar insertable hole 36a and a cam-bar insertable hole 37a, respectively, so that the cam-bar insertable hole 36a and the cam-bar insertable hole 37a are aligned with the position-control cam bar 19 in the optical axis direction. The rear second lens frame support plate 37 is further provided in a portion of the cam-bar insertable hole 37a with a guide key insertable recess 37b which allows the guide key 19c to enter therethrough.

A rotation transfer spring (rear torsion coil spring) 40 that is independent of the second lens frame returning spring 39 is fitted on a rear portion of the pivoted cylindrical portion 6b. The rotation transfer spring 40 is provided at opposite ends thereof with a stationary spring end 40a and a movable spring end 40b, respectively. The stationary spring end 40a is fixed to the swing arm portion 6c, and the movable spring end 40b stays at a position which is exposed to the rear of the second lens group moving frame 8 through the cam-bar insertable hole 37a (the movable spring end 40b stays in front of the position-control cam bar 19) when the second lens frame 6 is in the aforementioned photographing position thereof (see FIG. 25).

Figure 28:
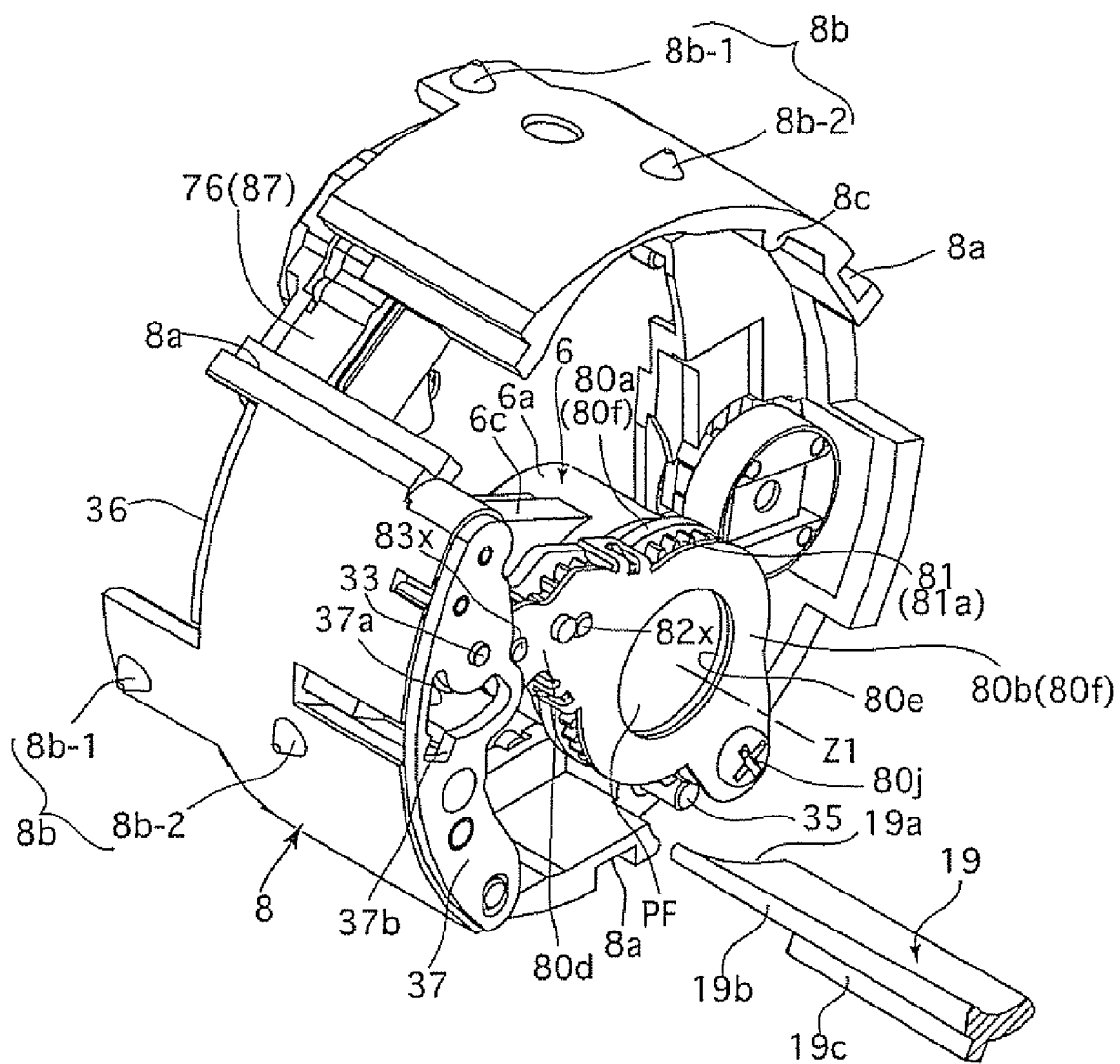
FIG. 28 is a view similar to that of FIG. 27, showing the elements shown in FIG. 27 in addition to the second lens group moving frame shown in FIGS. 10 and 21.
Figure 29:
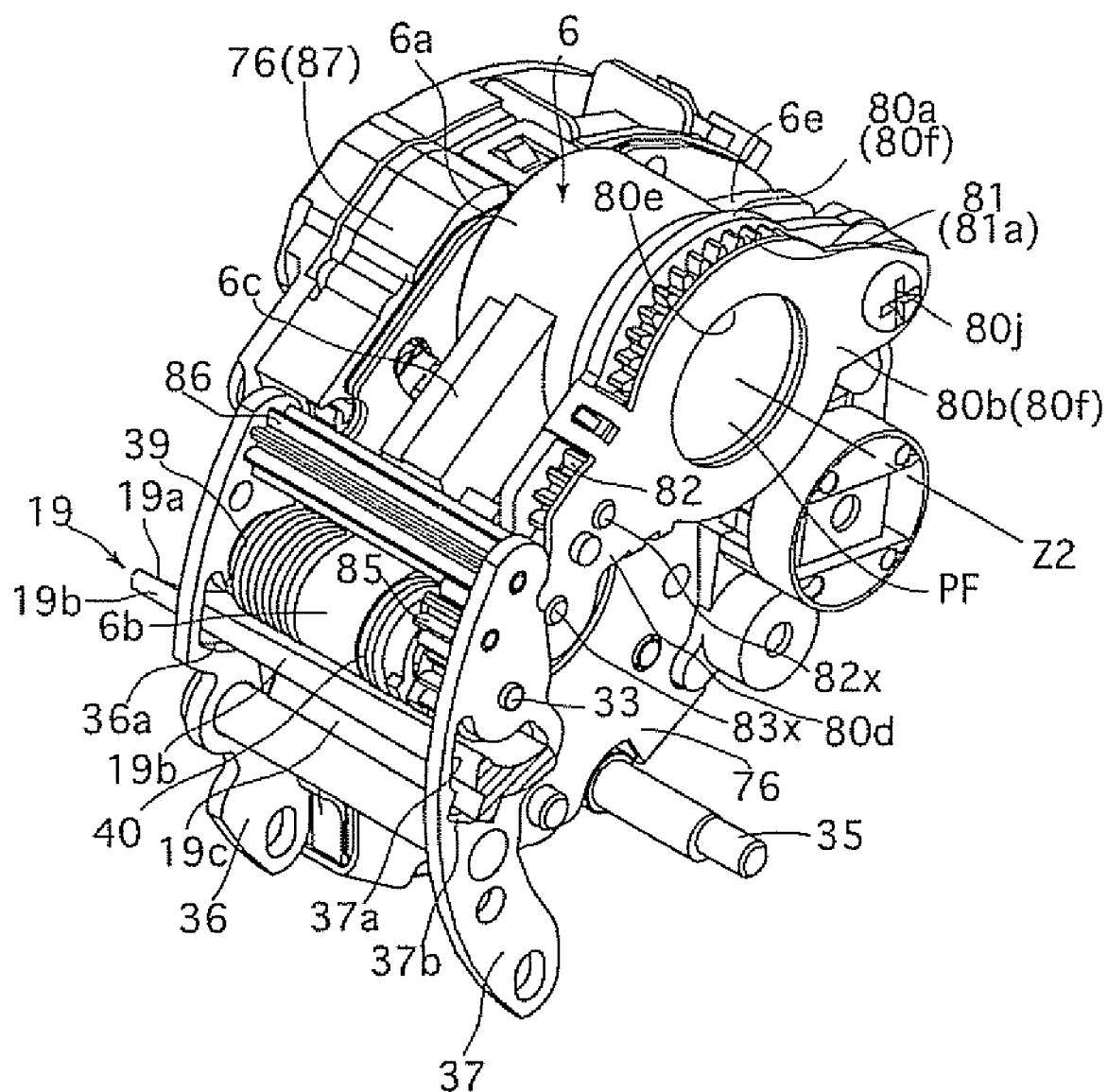
FIG. 29 is a view similar to that of FIG. 25, showing elements shown in FIG. 25 in a state where the zoom lens is in the fully-retracted state and where both the second lens group and the polarizing filter are in the radially retracted positions thereof, viewed obliquely from the rear of the zoom lens.
Figure 30:
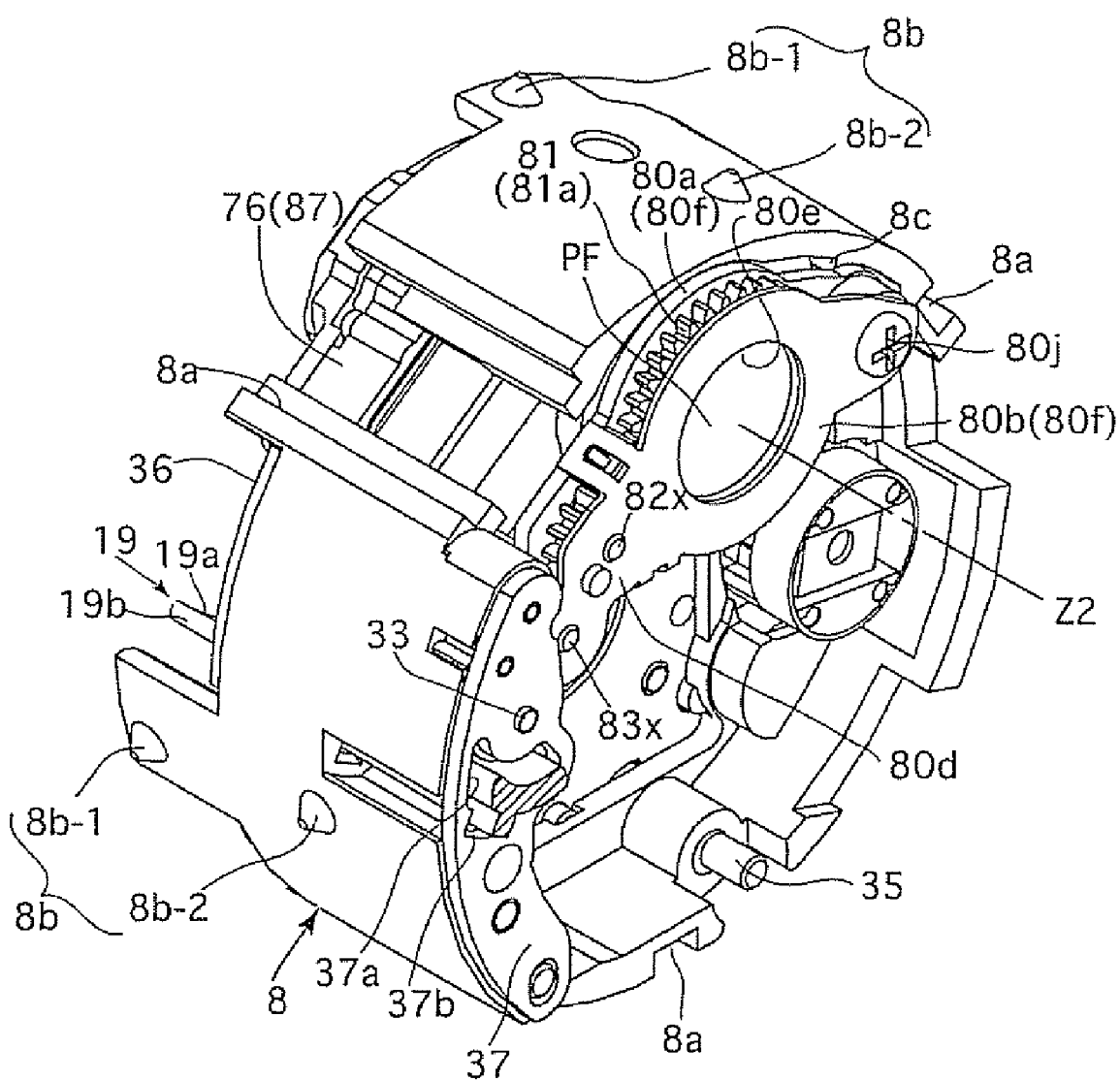
FIG. 30 is a view similar to that of FIG. 29, showing the elements shown in FIG. 29 in addition to the second lens group moving frame shown in FIGS. 10 and 21.

Due to the above described structure, during the course of moving the second lens group moving frame 8 rearward in the optical axis direction to approach the CCD holder 21 when the zoom lens 71 moves from a ready-to-photograph state to the fully-retracted state, the position-control cam bar 19 enters the cam-bar insertable hole 37a of the rear second lens frame support plate 37 (see FIGS. 29 and 30) and the retracting cam surface 19a of the position-control cam bar 19 comes into contact with the movable spring end 40b of the rotation transfer spring 40. A further rearward movement of the second lens frame 6 together with the second lens group moving frame 8 with the rear movable spring end 40b remaining in contact with the retracting cam surface 19a generates a component force in a direction to make the rear movable spring end 40b rotate while sliding on the retracting cam surface 19a in a radial direction of the pivot shaft 33 in accordance with the shape of the retracting cam surface 19a so that the rotation of the rear movable spring end 40b is transferred to the second lens group 6 via the stationary spring end 40a. Upon receiving a turning force from the retracting cam surface 19a via the rotation transfer spring 40, the second lens group 6 rotates about the pivot shaft 33 against the spring force of the second lens frame returning spring 39 from the aforementioned photographing position (shown in FIGS. 1, 25 through 28 and 33 through 34) toward the aforementioned radially retracted position (shown in FIGS. 2, 29 and 30) in accordance with the retracting movement of the second lens group moving frame 8. Upon the second lens frame 6 rotating to the radially retracted position, the rear movable spring end 40b moves from the retracting cam surface 19a to the radially-retracted-position holding surface 19b to be engaged therewith. Thereafter, the second lens frame 6 is not rotated about the pivot shaft 33 in a direction to the radially retracted position even if the second lens group moving frame 8 moves rearward. This rotation of the second lens frame 6 from the photographing position to the radially retracted position is predetermined to be completed before the second lens frame 6 retracts to the position of the AF lens frame 51 that is positioned behind the second lens frame 6 so that the second lens frame 6 and the AF lens frame 51 do not interfere with each other. After the second lens frame 6 reaches the radially retracted position, the second lens group moving frame 8 continues to move rearward until reaching the retracted position shown in FIG. 2. During this rearward movement of the second lens group moving frame 8, the second lens group 6 moves rearward together with the second lens group moving frame 8 with the second lens group 6 held in the radially retracted position, in which the rear movable spring end 40*b* remains in engaged with the radially-retracted-position holding surface 19*b*. Upon the zoom lens 71 moving to the fully-retracted state shown in FIG. 2, the position-control cam bar 19 projects forward from the cam-bar insertable hole 36*a* of the front second lens frame support plate 36 as shown in FIGS. 29 and 30.

When the zoom lens 71 advances from the retracted position shown in FIG. 2 to the ready-to-photograph position shown in FIG. 1, the second lens frame 6 is rotated from the radially retracted position to the photographing position by the biasing force of the second lens frame returning spring 39 upon the second lens frame 6 moving forward to a position in which the engagement of the rear movable spring end 40*b* of the rotation transfer spring 40 with the retracting cam surface 19*a* of the position-control cam bar 19 is released.

The spring force (rigidity) of the rotation transfer spring 40 is predetermined to be capable of transferring a torque from the rear movable spring end 40*b* to the second lens group 6 via the front stationary spring end 40*a* without the front stationary spring end 40*a* and the rear movable spring end 40*b* flexing toward each other. Namely, the resiliency of the rotation transfer spring 40 is determined to be greater than that of the second lens frame returning spring 39 at the time the second lens frame returning spring 39 holds the second lens frame 6 in the photographing position.

Figure 9:
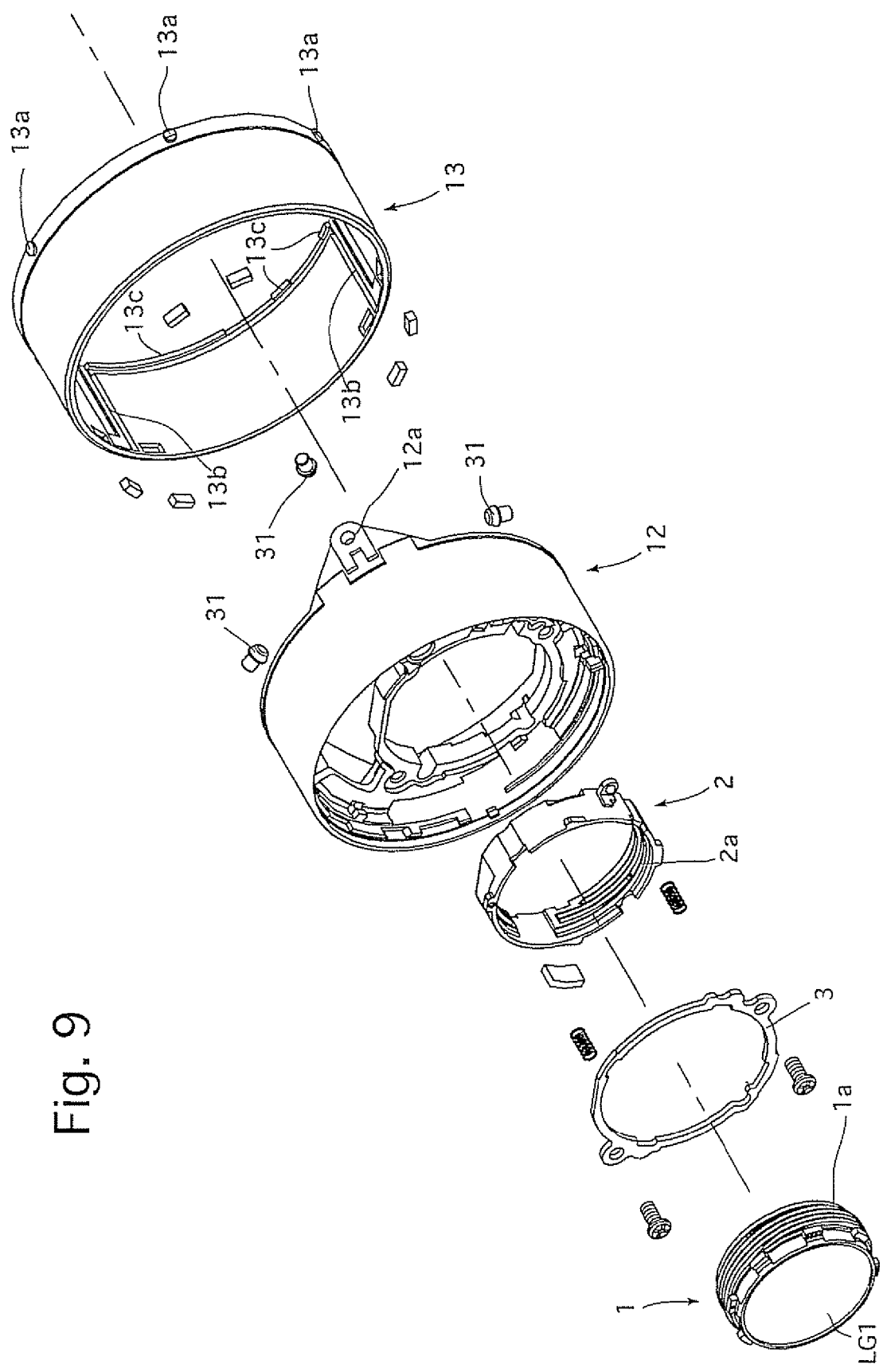
FIG. 9 is an exploded perspective view of portions of the zoom lens shown in FIG. 8A, showing elements of a support mechanism for supporting the first lens group of the zoom lens.
Figure 16:
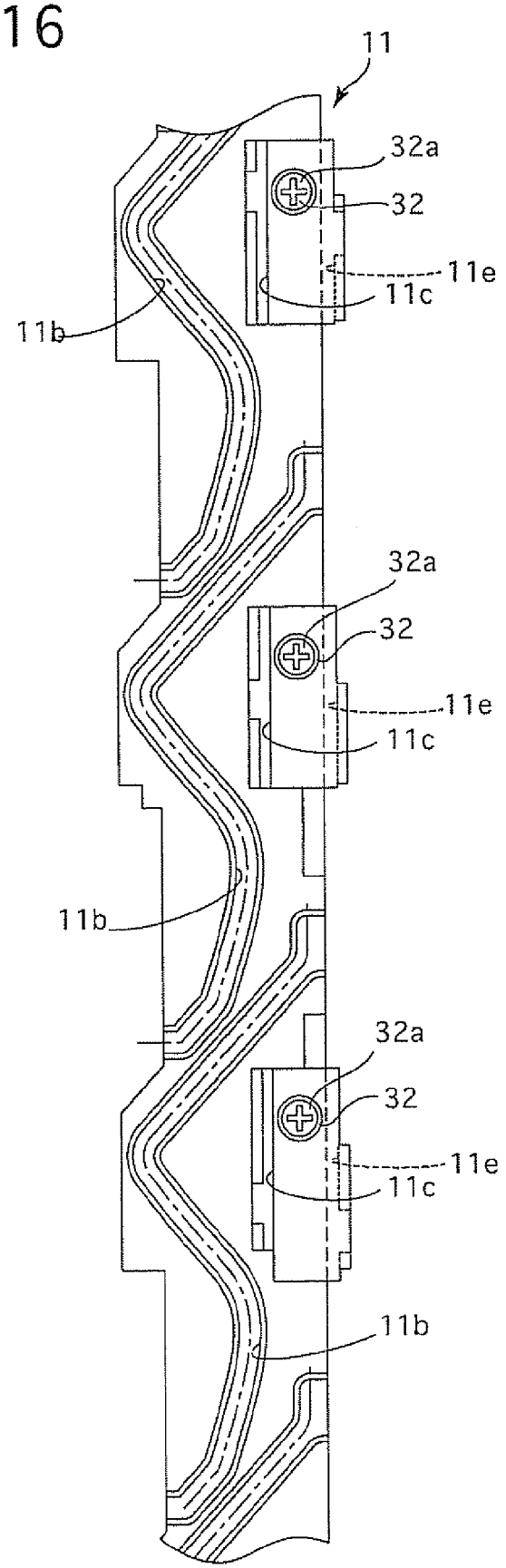
FIG. 16 is a developed view of a cam ring shown in FIG. 10.
Figure 18:
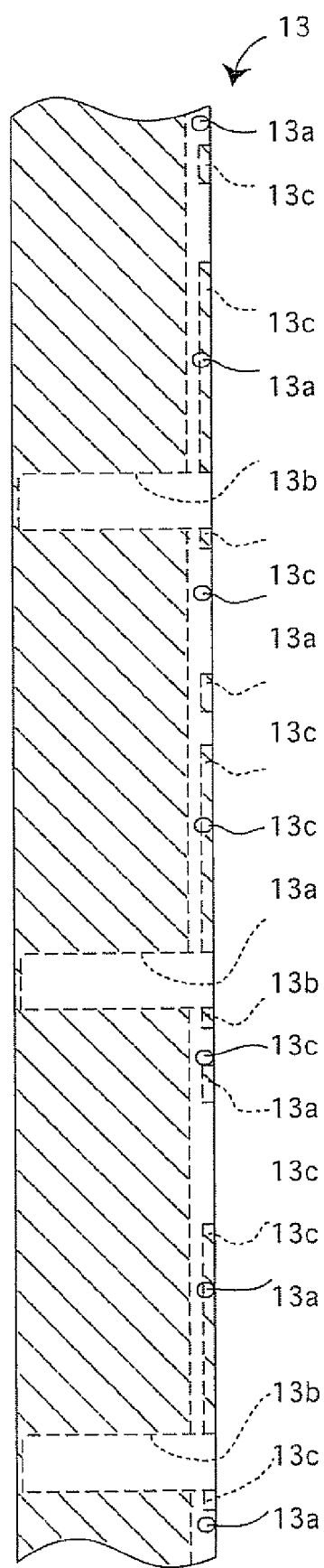
FIG. 18 is a developed view of a second external barrel shown in FIG. 9.
Figure 19:
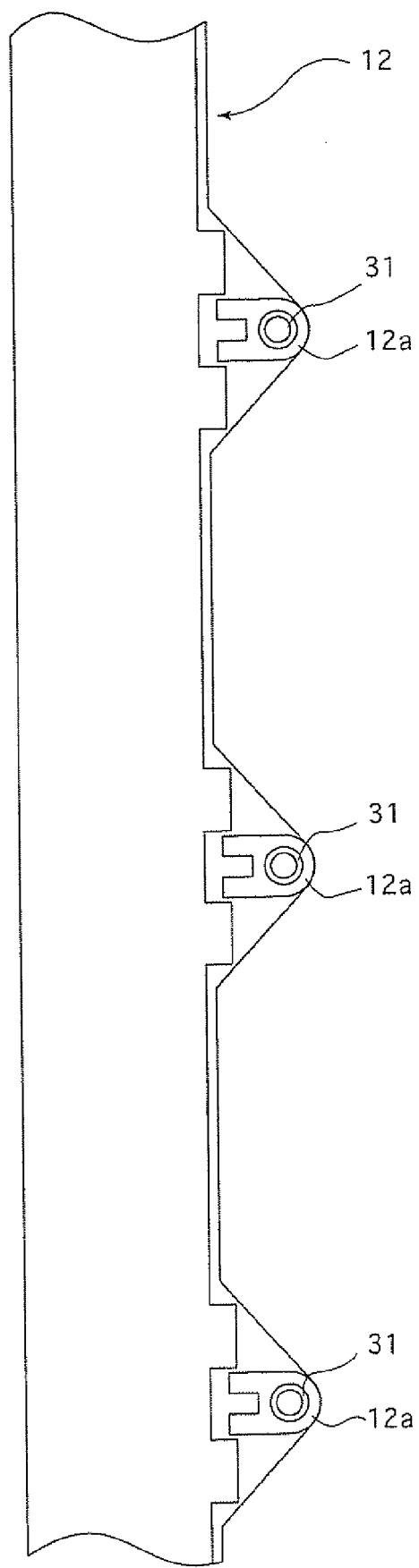
FIG. 19 is a developed view of a first external barrel shown in FIG. 9.

As shown in FIGS. 9 and 18, the second external barrel 13 is provided, on an inner peripheral surface thereof, with a set of three linear guide grooves 13*b* which are formed at different circumferential positions to extend parallel to one another in the optical axis direction. The first external barrel 12 is provided on an outer peripheral surface at the rear end thereof with a set of three engaging protrusions 12*a* which are slidably engaged in the set of three linear guide grooves 13*b*, respectively. Accordingly, the first external barrel 12 is guided linearly in the optical axis direction without rotating via the first linear guide ring 14 and the second external barrel 13. The second external barrel 13 is further provided on an inner peripheral surface thereof in the vicinity of the rear end of the second external barrel 13 with a discontinuous inner flange 13*c* which extends in a circumferential direction of the second external barrel 13. The cam ring 11 is provided on an outer peripheral surface thereof with a discontinuous circumferential groove 1*c* in which the discontinuous inner flange 13*c* is slidably engaged so that the cam ring 11 is rotatable about the lens barrel axis Z0 relative to the second external barrel 13 and so that the second external barrel 13 is not relatively movable in the optical axis direction to the cam ring 11. On the other hand, the first external barrel 12 is provided on an inner peripheral surface thereof with a set of three cam followers 31 which project radially inwards, and the cam ring 11 is provided on an outer peripheral surface thereof with a set of three outer cam grooves 11*b* (cam grooves for moving the first lens group LG1; see FIGS. 10 and 16) in which the set of three cam followers 31 are slidably engaged, respectively.

The zoom lens 71 is provided inside the first external barrel 12 with a first lens frame 1 which is supported by the first external barrel 12 via a first lens group adjustment ring 2. As shown in FIGS. 1, 2 and 9, the first lens group LG1 is supported by the first lens frame 1 to be fixed thereto. The first lens frame 1 is provided on an outer peripheral surface thereof with a male screw thread (adjusting screw thread) 1*a*, and the first lens group adjustment ring 2 is provided on an inner peripheral surface thereof with a female screw thread (adjusting screw thread) 2*a* which is engaged with the male screw thread 1*a*. The axial position of the first lens frame 1 relative to the first lens group adjustment ring 2 can be adjusted via the male screw thread 1*a* and the female screw thread 2*a*. A combination of the first lens frame 1 and the first lens group adjustment ring 2 is positioned inside of the first external barrel 12 to be supported thereby and to be movable in the optical axis direction relative to the first external barrel 12. The zoom lens 71 is provided in front of the first external barrel 12 with a fixing ring 3 which is fixed to the first external barrel 12 by set screws to prevent the first lens group adjustment ring 2 from moving forward and coming off the first external barrel 12.

The zoom lens 71 is provided between the first and second lens groups LG1 and LG2 with a shutter unit 76 including the shutter S and the adjustable diaphragm A. The shutter unit 76 is positioned in the second lens group moving frame 8 to be fixed thereto.

Operations of the zoom lens 71 that has the above described structure will be discussed hereinafter. The stage at which the cam ring 11 is driven to advance from the fully-retracted position shown in FIG. 2 to the position where the cam ring 11 rotates at the axial position without moving in the optical axis direction has been discussed above, and will be briefly discussed hereinafter. In the state shown in FIG. 2, in which the zoom lens 71 is in the retracted state, the zoom lens 71 is fully accommodated in the camera body 72. Upon a main switch 73 (see FIG. 22) provided on an outer surface of the digital camera 70 being turned ON in the fully-retracted state of the zoom lens 71 shown in FIG. 2, the zoom motor 150 is driven to rotate in a lens barrel advancing direction by control of a control circuit 75 (see FIG. 22) provided in the camera body 72, This rotation of the zoom motor 150 rotates the zoom gear 28. At the same time, this rotation of the zoom gear 28 causes a combination of the helicoid ring 18 and the third external barrel 15 to move forward while rotating about the lens barrel axis Z0 due to the engagement of the female helicoid 22*a* with the male helicoid 18*a*, and further causes the first linear guide ring 14 to move forward together with the third external barrel 15 and the helicoid ring 18. At this time, the cam ring 11 which rotates by rotation of the third external barrel 15 moves forward in the optical axis direction by an amount of movement corresponding to the sum of the amount of the forward movement of the first linear guide ring 14 and the amount of the forward movement of the cam ring 11 by a leading structure between the cam ring 11 and the first linear guide ring 14, i.e. r by the engagement of the set of three roller followers 32 with the lead slot portions 14*e*-3 of the set of three through-slots 14*e*, respectively. Once the helicoid ring 18 and the cam ring 11 advance to respective predetermined positions thereof, the male helicoid 18*a* is disengaged from the female helicoid 22*a* while the set of three roller followers 32 are disengaged from the lead slot portions 14*e*-3 to enter the front circumferential slot portions 14*e*-1, respectively. Consequently, each of the helicoid ring 18 and the cam ring 11 rotates about the lens barrel axis Z0 without moving in the optical axis direction.

A rotation of the cam ring 11 causes the second lens group moving frame 8, which is positioned inside the cam ring 11 and guided linearly in the optical axis direction via the second linear guide ring 10, to move in the optical axis direction with respect to the cam ring 11 in a predetermined moving manner due to the engagement of the set of three front cam followers 8b-1 with the set of three front inner cam grooves 11a-1 and the engagement of the set of three rear cam followers 8b-2 with the set of three rear inner cam grooves 11a-2, respectively. In the state shown in FIG. 2, in which the zoom lens 71 is in the fully-retracted state, the second lens frame 6, which is positioned inside of the second lens group moving frame 8, has rotated about the pivot shaft 33 to be held in the radially retracted position above the photographing optical axis Z1 by the action of the position-control cam bar 19 so that the optical axis of the second lens group LG2 moves from the photographing optical axis Z1 to a retracted optical axis Z2 positioned above the photographing optical axis Z1. During the course of movement of the second lens group moving frame 8 from the retracted position to a position in the zooming range, the second lens frame 6 is disengaged from the position-control cam bar 19 to rotate about the pivot shaft 33 from the radially retracted position to the photographing position shown in FIG. 1, so that the optical axis of the second lens group LG2 coincides with the photographing optical axis Z1, by the spring force of the second lens frame returning spring 39. Thereafter, the second lens frame 6 remains held in the photographing position until the zoom lens 71 is retracted into the camera body 72.

In addition, a rotation of the cam ring 11 causes the first external barrel 12, which is positioned around the cam ring 11 and guided linearly in the optical axis direction without rotating about the lens barrel axis Z0, to move in the optical axis direction relative to the cam ring 11 in a predetermined moving manner due to the engagement of the set of three cam followers 31 with the set of three outer cam grooves 11b, respectively.

Accordingly, an axial position of the first lens group LG1 relative to an imaging plane (a light-sensitive surface of the CCD image sensor 60) when the first lens group LG1 is moved forward from the retracted position is determined by the sum of the amount of forward movement of the cam ring 11 relative to the stationary barrel 22 and the amount of forward movement of the first external barrel 12 relative to the cam ring 11, and an axial position of the second lens group LG2 relative to the imaging plane when the second lens group LG2 is moved forward from the retracted position is determined by the sum of the amount of forward movement of the cam ring 11 relative to the stationary barrel 22 and the amount of forward movement of the second lens group moving frame 8 relative to the cam ring 11. A zooming operation is carried out by moving the first and second lens groups LG1 and LG2 on the photographing optical axis Z1 while changing the air distance therebetween. When the zoom lens 71 is driven to advance from the fully-retracted position shown in FIG. 2, the zoom lens 71 firstly moves into a state shown below the photographing lens axis Z1 in FIG. 1 in which the zoom lens 71 is at the wide-angle extremity. Subsequently, the zoom lens 71 moves into the state shown above the photographing lens axis Z1 in FIG. 1 in which the zoom lens 71 is at the telephoto extremity by a further rotation of the zoom motor 150 in a lens barrel advancing direction thereof. As can be seen from FIG. 1, the distance between the first and second lens groups LG1 and LG2 when the zoom lens 71 is at the wide-angle extremity is greater than that of when the zoom lens 71 is at the telephoto extremity. When the zoom lens 71 is at the telephoto extremity as shown above the photographing lens axis Z1 in FIG. 1, the first and second lens groups LG1 and LG2 have moved toward each other so as to have a distance therebetween which is smaller than the distance thereof when the zoom lens 71 is at the wide-angle extremity. This variation of the distance between the first and second lens groups LG1 and LG2 for zooming operation is achieved by contours of the plurality of inner cam grooves 11a (11a-1 and 11a-2) and the set of three outer cam grooves 11b. In the zooming range between the wide-angle extremity and the telephoto extremity, the cam ring 11, the third external barrel 15 and the helicoid ring 18 rotate at their respective axial positions, i.e., without moving in the optical axis direction.

When the first through third lens groups LG1, LG2 and LG3 are in the zooming range, a focusing operation is carried out by moving the third lens group L3 along the photographing optical axis Z1 by rotation of the AF motor 160 in accordance with an object distance.

Upon the main switch 73 being turned OFF, the zoom motor 150 is driven to rotate in a lens barrel retracting direction so that the zoom lens 71 operates in the reverse manner to the above described advancing operation to fully retract the zoom lens 71 into the camera body 72 as shown in FIG. 2. During the course of this retracting movement of the zoom lens 71, the second lens frame 6 rotates about the pivot shaft 33 to the radially retracted position by the position-control cam bar 19 while moving rearward together with the second lens group moving frame 8. When the zoom lens 71 is fully retracted into the camera body 72, the second lens group LG2 is retracted into the space radially outside the space in which the third lens group LG3, the low-pass filter LG4 and the CCD image sensor 60 are retracted as shown in FIG. 2, i.e., the second lens group LG2 is radially retracted into an axial range substantially identical to an axial range in the optical axis direction in which the third lens group LG3, the low-pass filter LG4 and the CCD image sensor 60 are positioned. This structure of the digital camera 70 for retracting the second lens group LG2 in this manner reduces the length of the zoom lens 71 when the zoom lens 71 is fully retracted, thus making it possible to reduce the thickness of the camera body 72 in the optical axis direction, i.e., in the horizontal direction as viewed in FIG. 2.

As mentioned above, the zoom lens 71 is further provided, between the second lens group LG2 and the third lens group LG3 in a ready-to-photograph state of the zoom lens 71, with the polarizing filter PF that can be inserted into and removed from a photographing optical path between the second lens group LG2 and the third lens group LG3. The polarizing filter PF is held by an insertable/retractable filter holding frame (insertable/retractable frame) 80 which is rotatable about the pivot shaft 33, about which the second lens frame 6 is rotatable. Moreover, the polarizing filter PF is supported by the insertable/retractable filter holding frame 80 so that the polarizing filter PF is rotatable about the axis thereof relative to the insertable/retractable filter holding frame 80. The drive mechanism for the polarizing filter PF will be discussed hereinafter.

Figure 23:
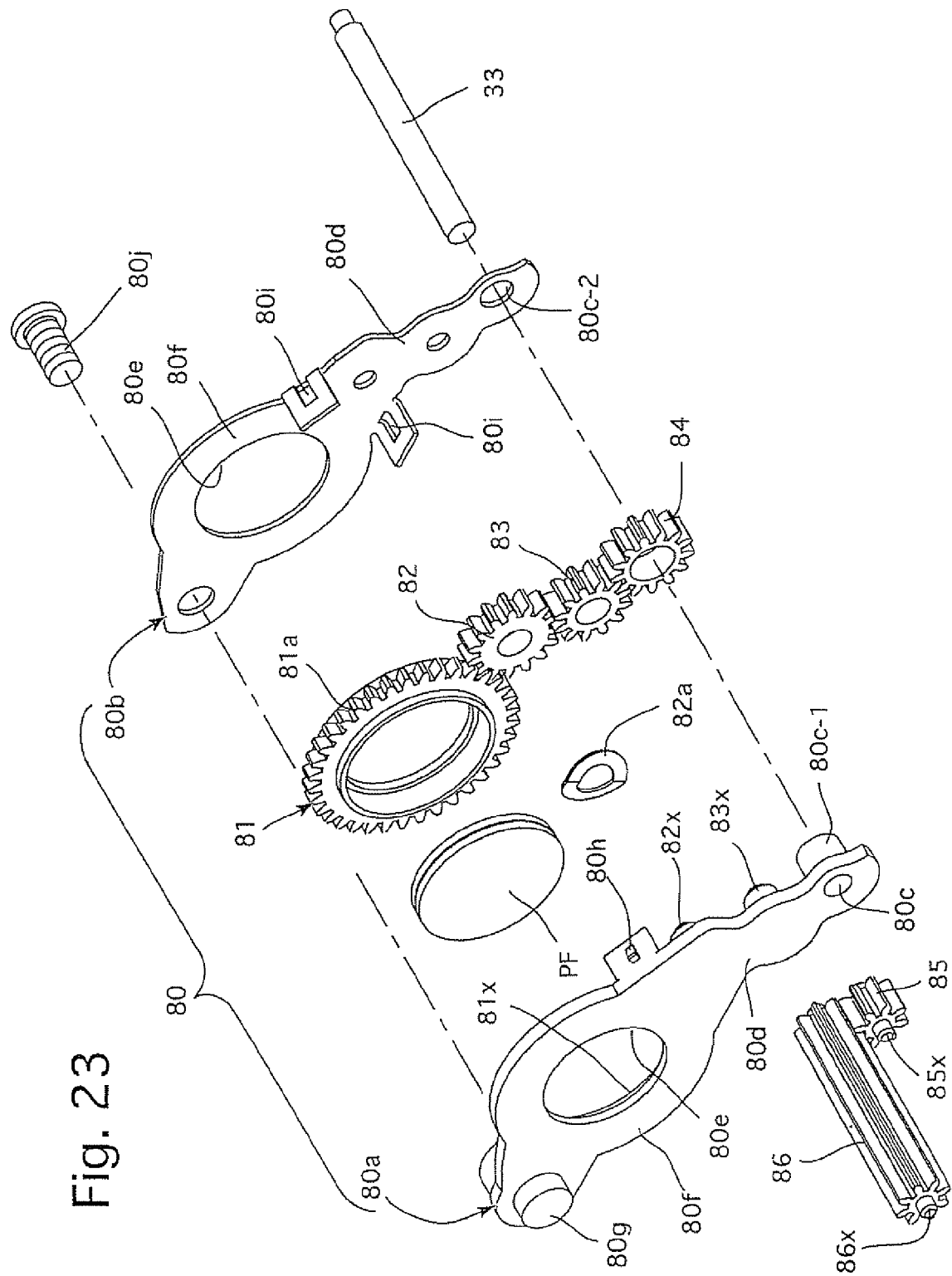
FIG. 23 is an exploded perspective view of a mechanism shown in FIG. 10 provided for driving the polarizing filter.

As shown in FIG. 23, the insertable/retractable filter holding frame 80 includes a front support plate 80a and a rear support plate 80b. The front support plate 80a is provided at one end thereof with a pivot shaft insertion hole 80c which is fitted on the pivot shaft 33 to be freely rotatable relative thereto. The front support plate 80a is provided on the rear thereof with a hollow cylindrical projection 80c-1, the axial hole of which is coincident with the pivot shaft insertion hole 80c. The rear support plate 80b is provided, at a position thereon which faces the pivot shaft insertion hole 80c in the optical axis direction, with a circular hole 80c-2. Each of the front support plate 80a and the rear support plate

80*b* is provided with a swingable arm 80*d* and a filter holding portion 80*f*. The swingable arm 80*d* extends in a radial direction of the pivot shaft insertion hole 80*c*, and the filter holding portion 80*f* is integral with the swingable arm 80*d* and includes a circular opening 80*e*. The front support plate 80*a* is further provided on the front and the rear thereof with a stop portion 80*g* and a rotation support flange 81*x*, respectively. The stop portion 80*g* is positioned at an end of the front support plate 80*a* which is opposite from the other end thereof at which the pivot shaft insertion hole 80*c* is formed. The rotation support flange 81*x* is formed on a rear surface of the front support plate 80*a* which faces the rear support plate 80*b*. The rotation support flange 81*x* is formed in a ring shape which is positioned around the circular opening 80*e* of the front support plate 80*a*. The axis of the rotation support flange 81*x* is parallel to the photographing optical axis Z1. The front support plate 80*a* is provided on opposite side edges thereof with a pair of rearward projections on which a pair of engaging lugs 80*h* are formed, respectively, and the rear support plate 80*b* is provided on opposite side edges thereof with a corresponding pair of forward projections in which a pair of engaging holes 80*i* are formed, respectively. The front support plate 80*a* and the rear support plate 80*b* are fixed to each other by a set screw 80*j* with the pair of engaging lugs 80*h* being engaged in the pair of engaging holes 80*i*, respectively. After the front support plate 80*a* and the rear support plate 80*b* are fixed to each other by the set screw 80*j* in such a manner, the pivot shaft 33 is inserted into the pivot shaft insertion hole 80*c* and the circular hole 80*c*-2. Accordingly, the insertable/retractable filter holding frame 80 is supported by the pivot shaft 33 to be rotatable (swingable) about the pivot shaft 33.

Figure 24:
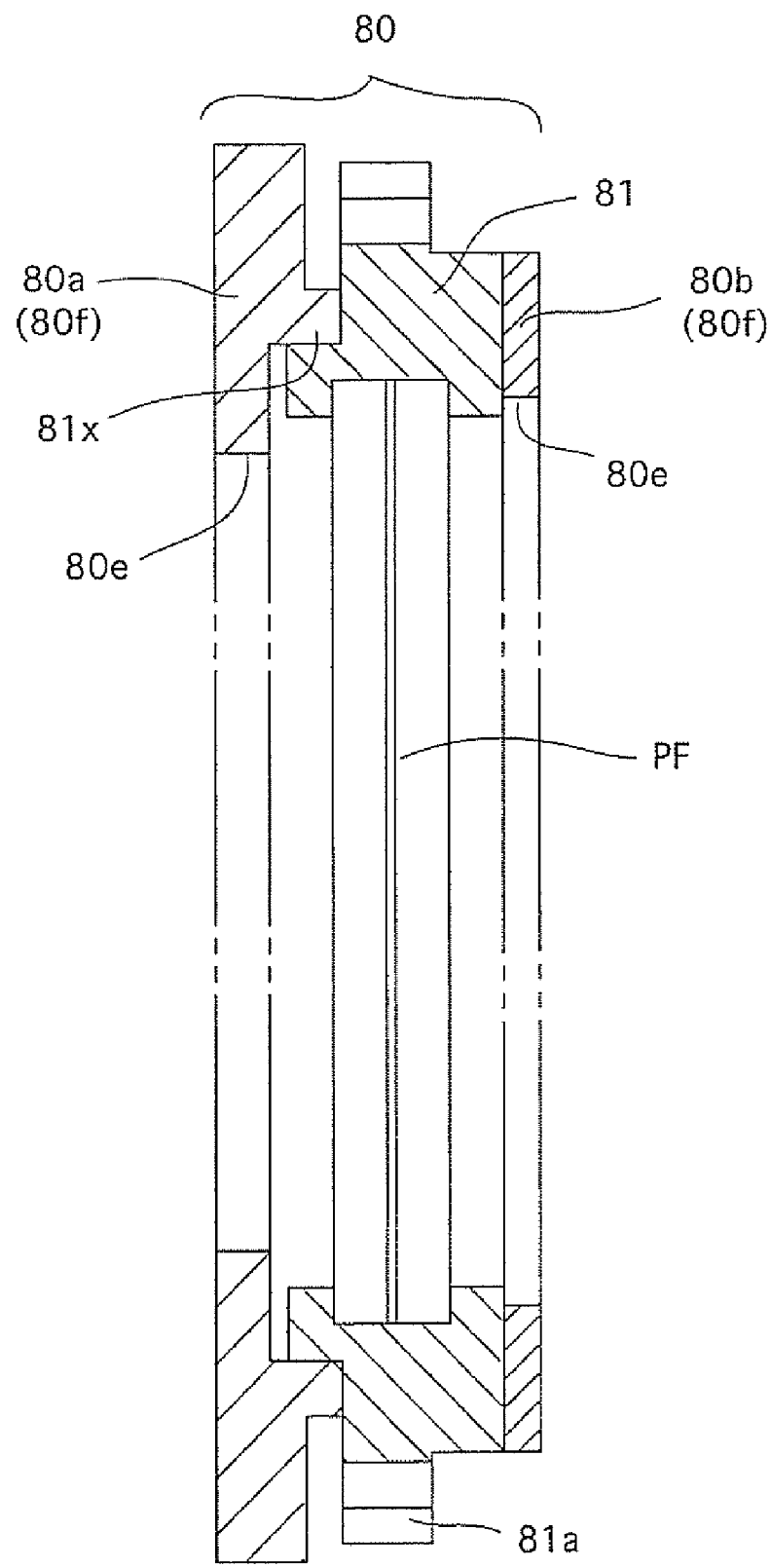
FIG. 24 is a sectional view of an insertable/retractable filter holding frame and a filter holding ring which holds the polarizing filter, taken along a plane orthogonal to the photographing optical axis of the zoom lens.

The polarizing filter PF is held by a filter holding ring (annular holding frame) 81. As shown in FIG. 24, the filter holding ring 81 is held between the filter holding portions 80*f* of the front support plate 80*a* and the rear support plate 80*b*, and is fitted on the rotation support flange 81*x* to be freely rotatable thereon. In a state where the filter holding ring 81 is supported by the insertable/retractable filter holding frame 80, the polarizing filter PF is positioned so that front and rear surfaces thereof are exposed to the circular opening 80*e* of the front support plate 80*a* and the circular opening 80*e* of the rear support plate 80*b*, respectively.

The filter holding ring 81 is provided on the outer edge thereof with a filter gear (spur gear) 81*a* which is in mesh with a friction gear (relay gear/spur gear) 82. The friction gear 82 is in mesh with an idle gear (planetary gear/spur gear) 83, and the idle gear 83 is in mesh with a rotation control gear (sun gear/spur gear) 84. The front support plate 80*a* is provided on the rear thereof with two rotational pins 82*x* and 83*x* each of which projects rearwards, and the friction gear 82 and the idle gear 83 are rotatably fitted on the rotational pins 82*x* and 83*x*, respectively. The rotation control gear 84 is rotatably fitted on the cylindrical projection 80*c*-1. Since the cylindrical projection 80*c*-1 and the pivot shaft 33 are coaxially arranged, the rotation control gear 84 is driven about the pivot shaft 33. The rotation control gear 84 is in mesh with an idle gear 85 which is in mesh with a drive gear 86. Opposite ends of a rotational shaft 85*x* of the idle gear 85 are fitted in front and rear bearing holes formed on the second lens group moving frame 8 and the rear second lens frame support plate 37, respectively, to be supported thereby. Likewise, opposite ends of a rotational shaft 86*x* of the drive gear 86 are fitted in front and rear bearing holes formed on the front and rear second lens frame support plates 36 and 37 to be supported thereby, respectively. Axes of the rotational pin 82*x*, the rotational pin 83*x*, the rotational shaft 85*x* and the rotational shaft 86*x* are parallel to the photographing optical axis Z1. As mentioned above, the rotation support flange 81*x*, which serves the axis of rotation of the filter gear 81*a* (the filter holding ring 81), and the pivot shaft 33, which serves as the axis of rotation of the rotation control gear 84, are also parallel to the photographing optical axis Z1. Therefore, each of all the gears constituting a gear train from the filter gear 81*a* to the drive gear 86 is driven about an associated axis of rotation parallel to the photographing optical axis Z1. The friction gear 82 is pressed against the rear support plate 80*b* by a spring washer (an element of the drive controller/a rotation-resistance imposing member) 82*a* so that a predetermined magnitude of resistance is continuously exerted on the friction gear 82.

Figure 25:
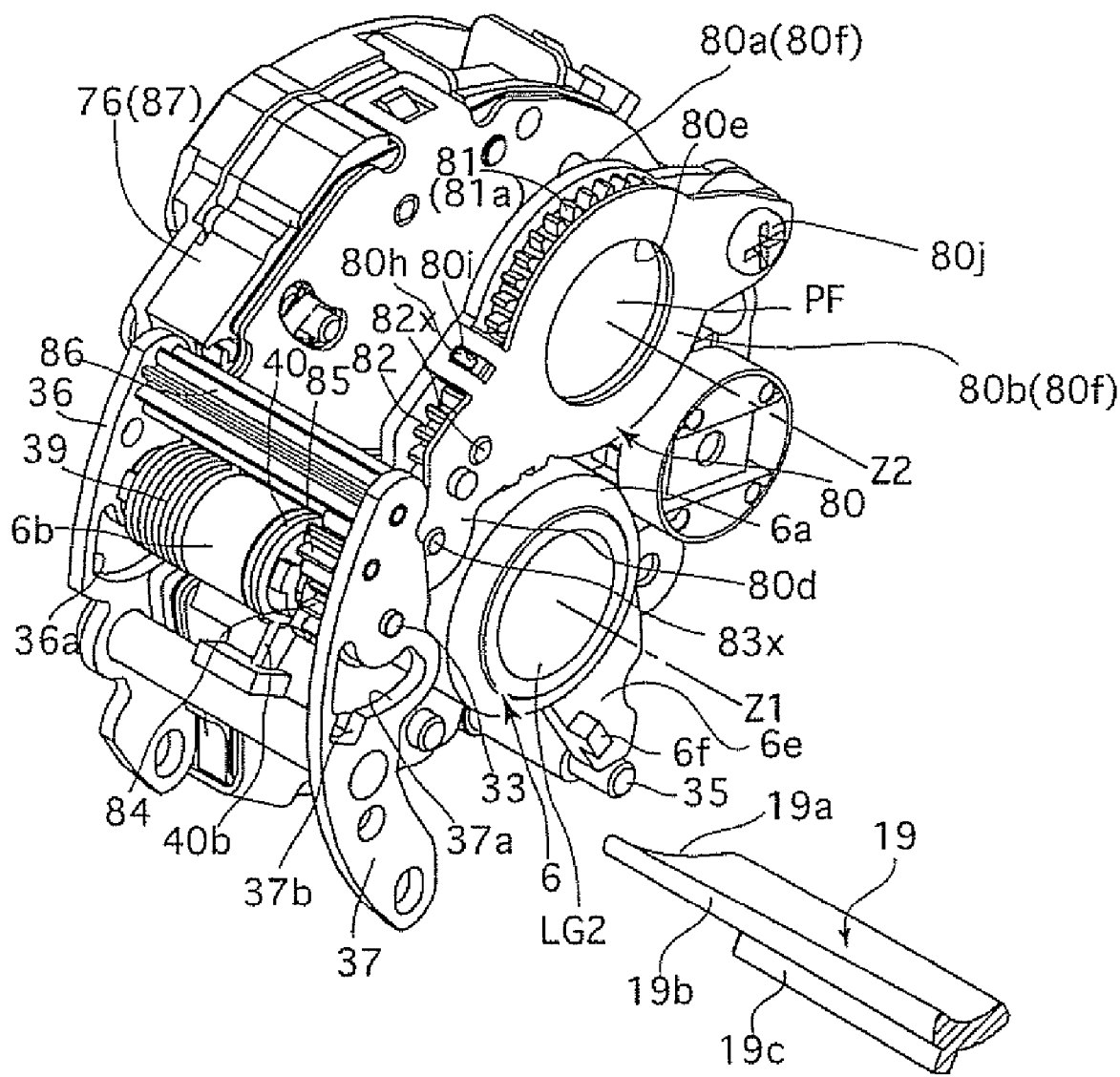
FIG. 25 is a perspective view of elements of the zoom lens shown in FIGS. 1 and 2 in a state where the zoom lens is in a ready-to-photograph state and where the polarizing filter is in a radially retracted position (off-axis position) thereof, viewed obliquely from the rear of the zoom lens.
Figure 26:
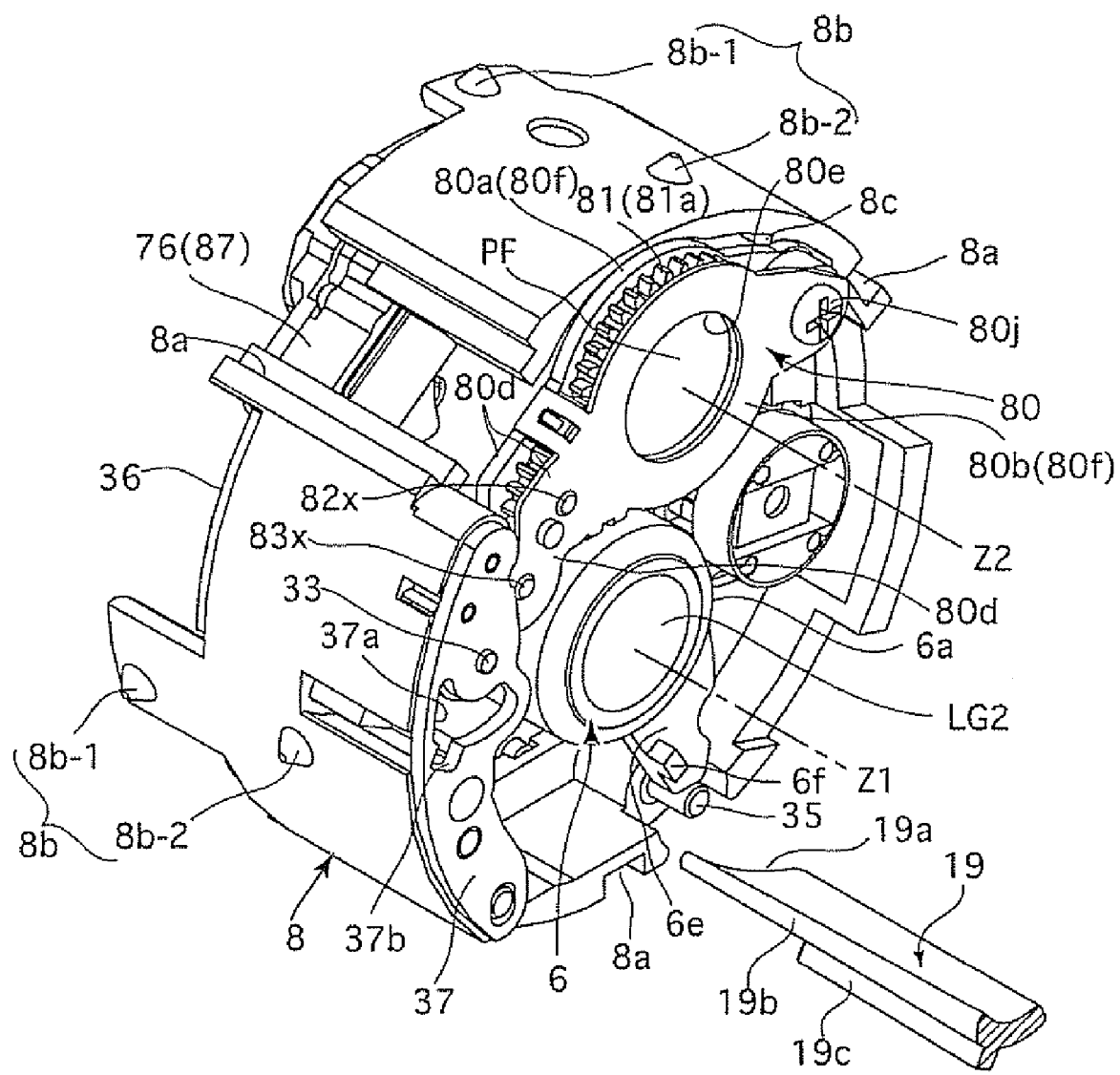
FIG. 26 is a view similar to that of FIG. 25, showing the elements shown in FIG. 25 in addition to the second lens group moving frame shown in FIGS. 10 and 21.
Figure 27:
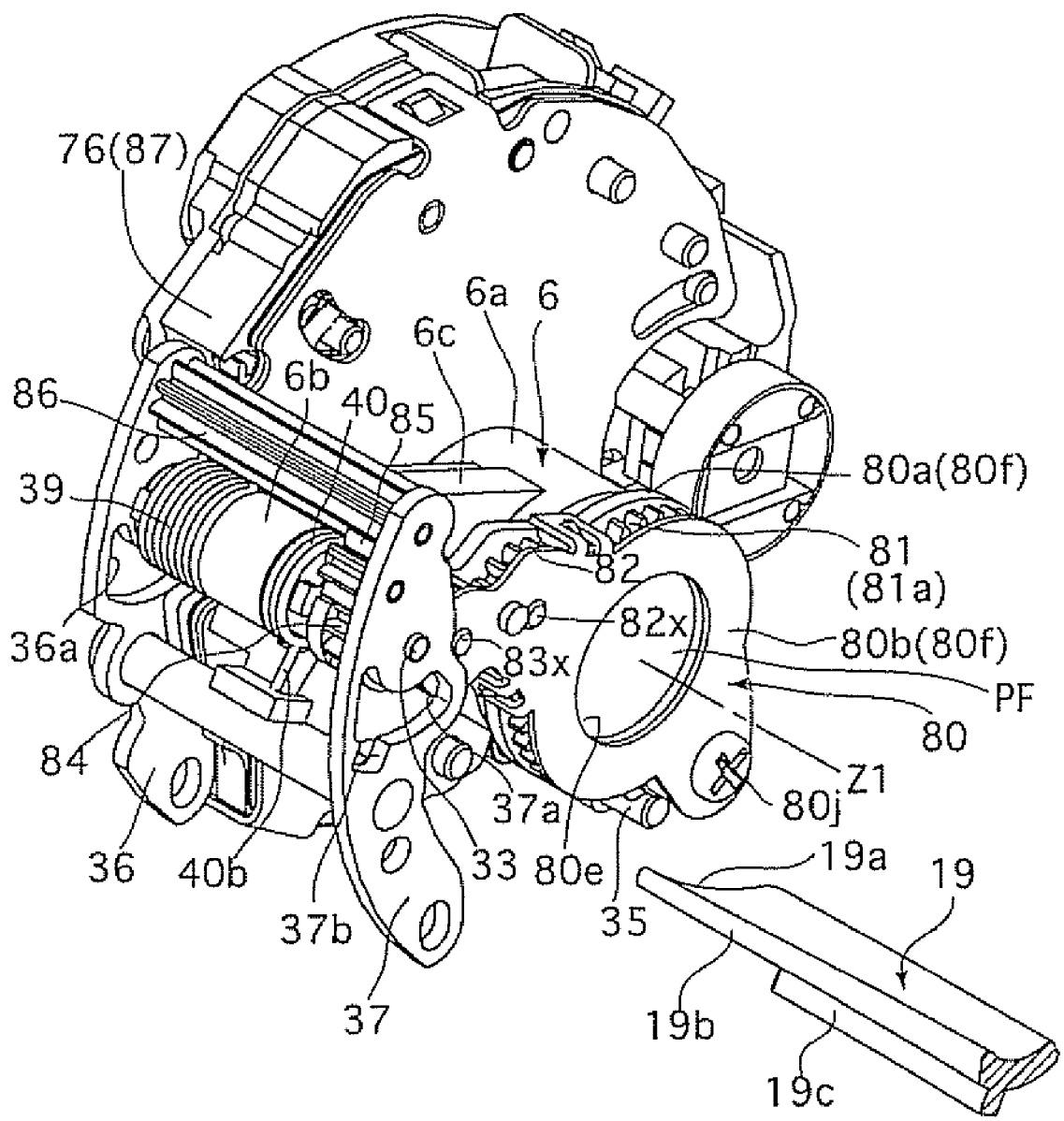
FIG. 27 is a view similar to that of FIG. 25, showing the elements shown in FIG. 25 in a state where the zoom lens is in a ready-to-photograph state and where the polarizing filter is in an inserted position (on-axis position) thereof, viewed obliquely from the rear of the zoom lens.

The drive gear 86 is driven forward and reverse by a filter drive motor 87 (see FIG. 22) mounted to the second lens group moving frame 8. The filter drive motor 87 together with actuators for driving the shutter S and the adjustable diaphragm A is provided in the shutter unit 76. As shown in FIGS. 25, 27 and 29, the shutter unit 76 and the insertable/retractable filter holding frame 80 are apart from each other with the second lens group 6 being positioned between the shutter unit 76 and the insertable/retractable filter holding frame 80. The drive gear 86 is formed as a long gear which is elongated in the optical axis direction to be capable of transferring a driving force from the filter drive motor 87 on the shutter unit 76 to the idle gear 85 on the insertable/retractable filter holding frame 80 side. If the drive gear 86 is rotated, the rotation control gear 84 rotates via the idle gear 85. Since the friction gear 82 sustains a resistance by the spring washer 82*a*, the rotation control gear 84 and the idle gear 83 operate as a sun gear and a planet gear of a planetary gear train, respectively, so that the idle gear 83 revolves around the rotation control gear 84 thereon while rotating on the axis of the idle gear 83 when the rotation control gear 84 is rotated. This causes the insertable/retractable filter holding frame 80 to be rotated forward and reverse about the pivot shaft 33 in accordance with forward and reverse rotations of the drive gear 86, respectively. Consequently, similar to the second lens group LG2 that is held by the second lens frame 6, the polarizing filter PF can be moved between an inserted position (shown in FIGS. 27, 28, 31 and 33) in which the polarizing filter PF is positioned on the photographing optical axis Z1, and a radially retracted position (removed position; shown in FIGS. 25, 26, 29, 30, 32 and 34) in which the polarizing filter PF is positioned on the retracted optical axis Z2. Specifically, the polarizing filter PF moves on the photographing optical axis Z1 if the drive gear 86 rotates in a direction K1 shown in FIGS. 32 through 34, and the polarizing filter PF moves away from the photographing optical axis Z1 to move on the retracted optical axis Z2 if the drive gear 86 rotates in a direction K2 shown in FIGS. 32 through 34. Accordingly, the idle gear 83, the rotation control gear 84, the idle gear 85, the drive gear 86 and the filter drive motor 87 constitute an inserting/removing driving device which makes the insertable/retractable filter holding frame 80 rotate in forward and reverse directions to bring the polarizing filter PF to the inserted position and the radially retracted position, respectively.

Figure 34:
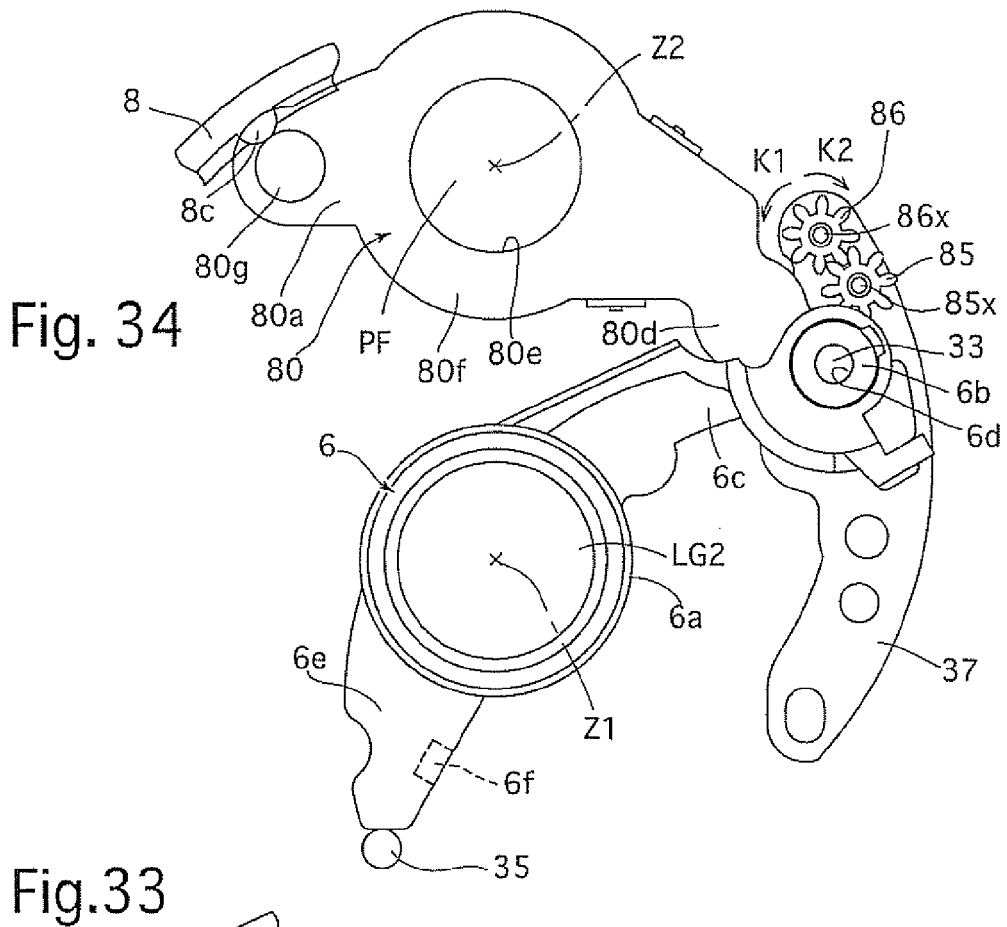
FIG. 34 is a front elevational view of the second lens frame, the insertable/retractable filter holding frame, and other elements, when the second lens group is positioned on the photographing optical axis while the polarizing filter is retracted to be positioned on a retracted optical axis positioned above the photographing optical axis.
Figure 33:
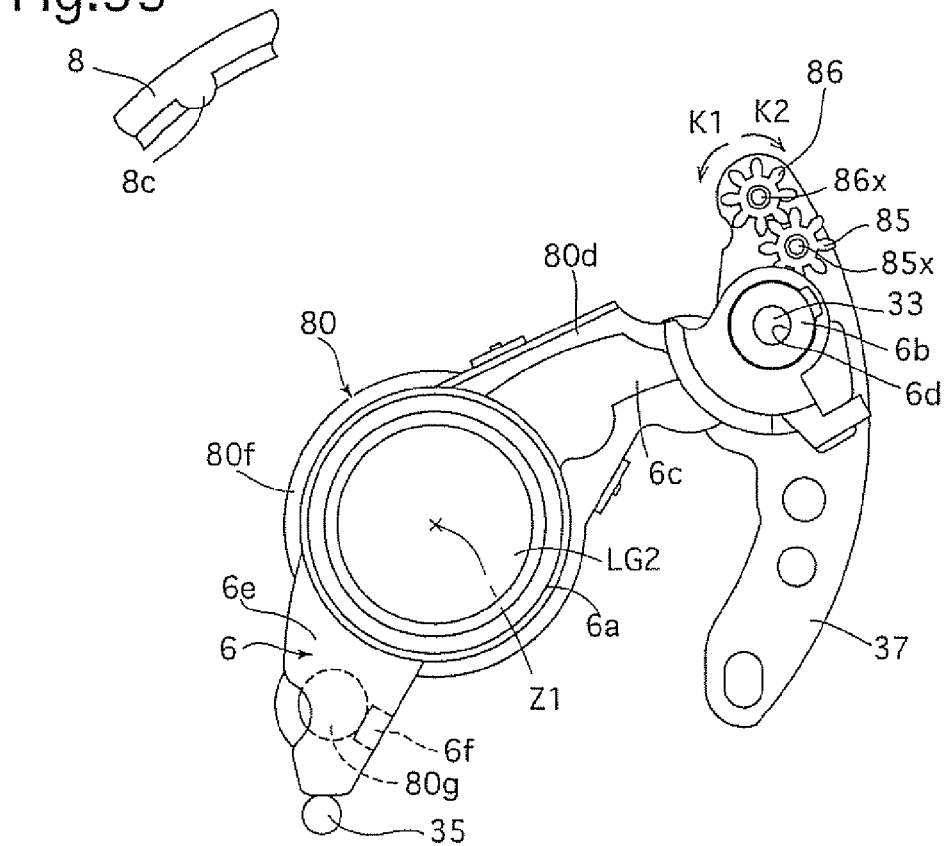
FIG. 33 is a front elevational view of a second lens frame, the insertable/retractable filter holding frame and other elements when both the second lens group and the polarizing filter are positioned on the photographing optical axis.

Upon the insertable/retractable filter holding frame 80 being rotated to a point where the polarizing filter PF is in the inserted position, the stop portion 80*g* comes into contact with the stop projection 6*f* of the second lens frame 6 as shown in FIG. 33 to prevent the insertable/retractable filter holding frame 80 from further rotating in a filter inserting direction (counterclockwise as viewed in FIG. 33). Additionally, upon the insertable/retractable filter holding frame 80 being rotated to a point where the polarizing filter PF is in the radially retracted position, the stop portion 80g comes into contact with a stop protrusion 8c which protrudes from an inner peripheral surface of the second lens group moving frame 8 as shown in FIG. 34 to prevent the insertable/retractable filter holding frame 80 from further rotating in a filter removing direction (clockwise as viewed in FIG. 34).

According to the above described structure, in a ready-to-photograph state of the zoom lens 71 shown in FIG. 1, the inserting/removing operation of the polarizing filter PF (the forward/reverse rotation of the insertable/retractable filter holding frame 80) for bringing the polarizing filter PF to be positioned on or off the photographing optical axis Z1 can be freely carried out independently of the drive mechanism for zooming and focusing that drives the first, second and third lens groups LG1, LG2 and LG3. Specifically, FIGS. 25, 26 and 34 show a state where the polarizing filter PF is removed from the photographing optical axis Z1 in a ready-to-photograph state of the zoom lens 71, while FIGS. 27, 28 and 33 show a state where the polarizing filter PF is inserted to lie on the photographing optical axis Z1 in a ready-to-photograph state of the zoom lens 71. As can be understood from these drawings, the insertable/retractable filter holding frame 80 swings inside the second lens group moving frame 8, and accordingly, the polarizing filter PF can be inserted into and removed from a photographing optical path between the second lens group LG2 and the third lens group LG3 without interfering with operations of other optical elements such as the third lens group LG3 in the entire zooming range from the wide-angle extremity (shown by a lower half of the zoom lens 71 in FIG. 1) to the telephoto extremity (shown by an upper half of the zoom lens 71 in FIG. 1). In an inserted state of the polarizing filter PF, in which the axis of the polarizing filter PF lies on the photographing optical axis Z1, the polarizing filter PF is positioned immediately behind the second lens group LG2, so that a light bundle which emerges from the second lens group LG2 passes through the polarizing filter PF to be incident on the third lens group LG3. On the other hand, in a radially retracted state of the polarizing filter PF, in which the polarizing filter PF is retracted so that the axis thereof lies on the retracted optical axis Z2, the light bundle which emerges from the second lens group LG2 does not pass through the polarizing filter PF.

Figure 32:
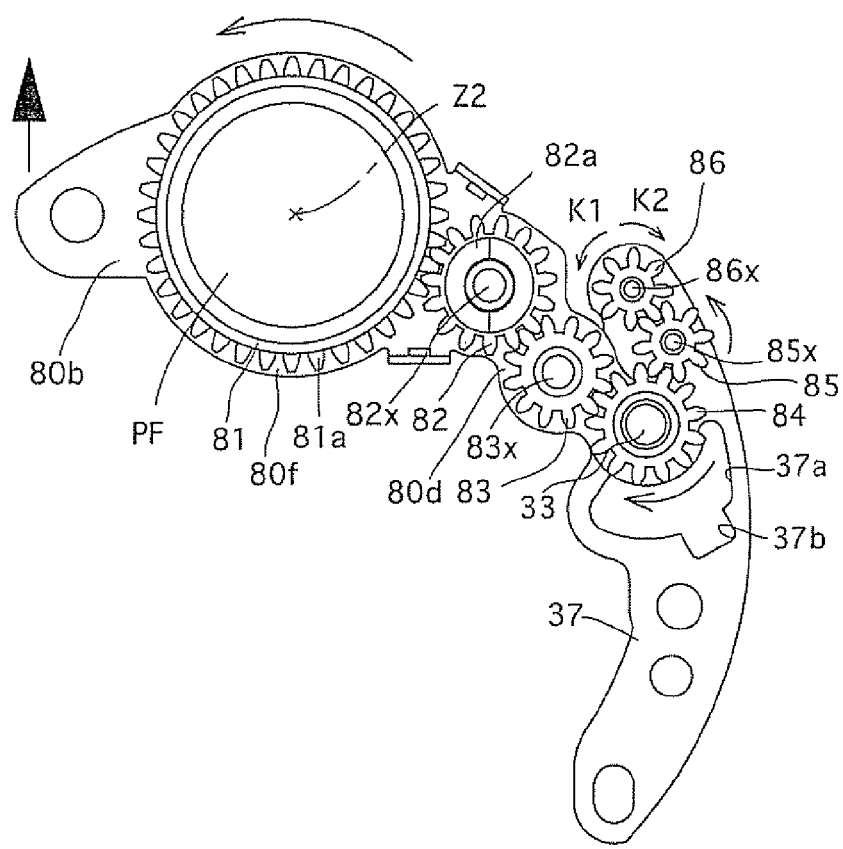
FIG. 32 is a front elevational view of the filter driving mechanism in a state where the polarizing filter is in the radially retracted position.
Figure 31:
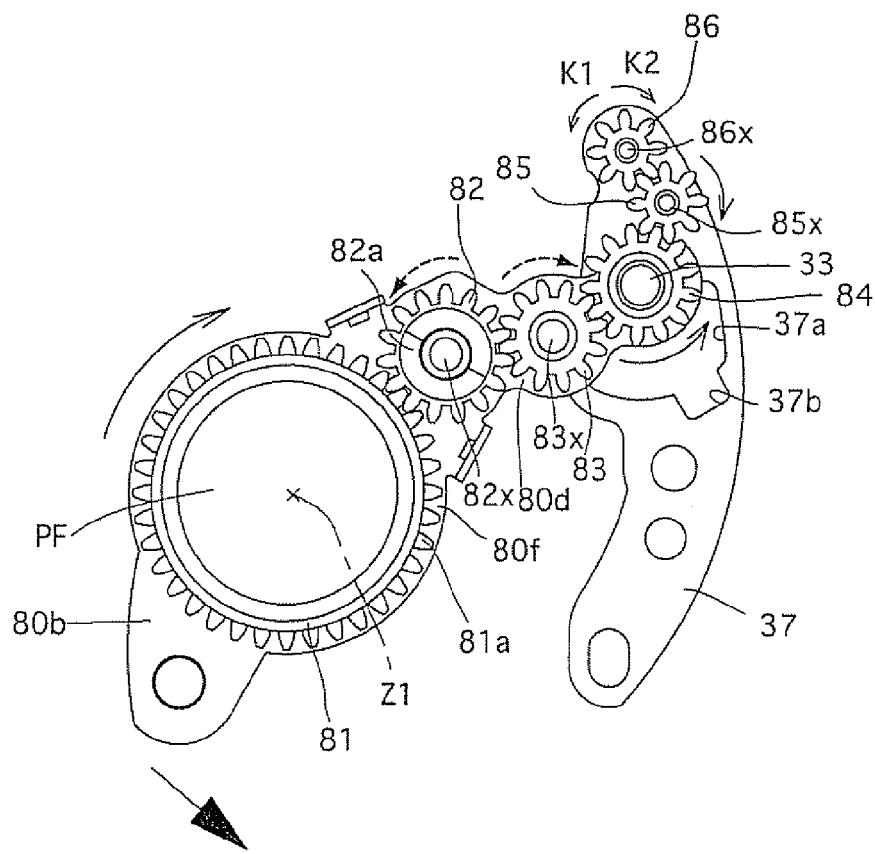
FIG. 31 is a front elevational view of the filter driving mechanism in a state where the polarizing filter is in the inserted position, in which the polarizing filter is positioned on the photographing optical axis.

In the inserted state of the polarizing filter PF, the insertable/retractable filter holding frame 80 is prevented from rotating in the filter inserting direction by the engagement of the stop portion 80g with the stop projection 6f of the second lens frame 6 as described above (see FIG. 33). In this state where the insertable/retractable filter holding frame 80 is prevented from rotating in the filter inserting direction, further rotation of the drive gear 86 in a filter inserting direction (the aforementioned direction K1) causes the idle gear 83 and the friction gear 82 to rotate (on the axes thereof) in opposite directions shown by two broken-line arrows in FIG. 31, respectively, against the resistance exerted on the friction gear 82 by the spring washer 82a. Consequently, the filter holding ring 81 rotates clockwise as viewed in FIG. 31, and accordingly, the filter holding ring 81 can be rotated at a fixed position on the photographing optical axis Z1 relative to the insertable/retractable filter holding frame 80. Conversely, if the drive gear 86 is driven in a filter removing direction (the aforementioned direction K2) in the inserted state of the polarizing filter PF of FIGS. 31 and 33, the friction gear 82 does not rotate (on the axis thereof) but the idle gear 83 revolves around the rotation control gear 84 thereon while rotating on the axis of the idle gear 83, so that the insertable/retractable filter holding frame 80 is rotated about the pivot shaft 33 clockwise from the position in FIGS. 31 and 33. Consequently, the polarizing filter PF moves away from the photographing optical axis Z1 to move on the retracted optical axis Z2 as shown in FIGS. 32 and 34.

Figure 22:
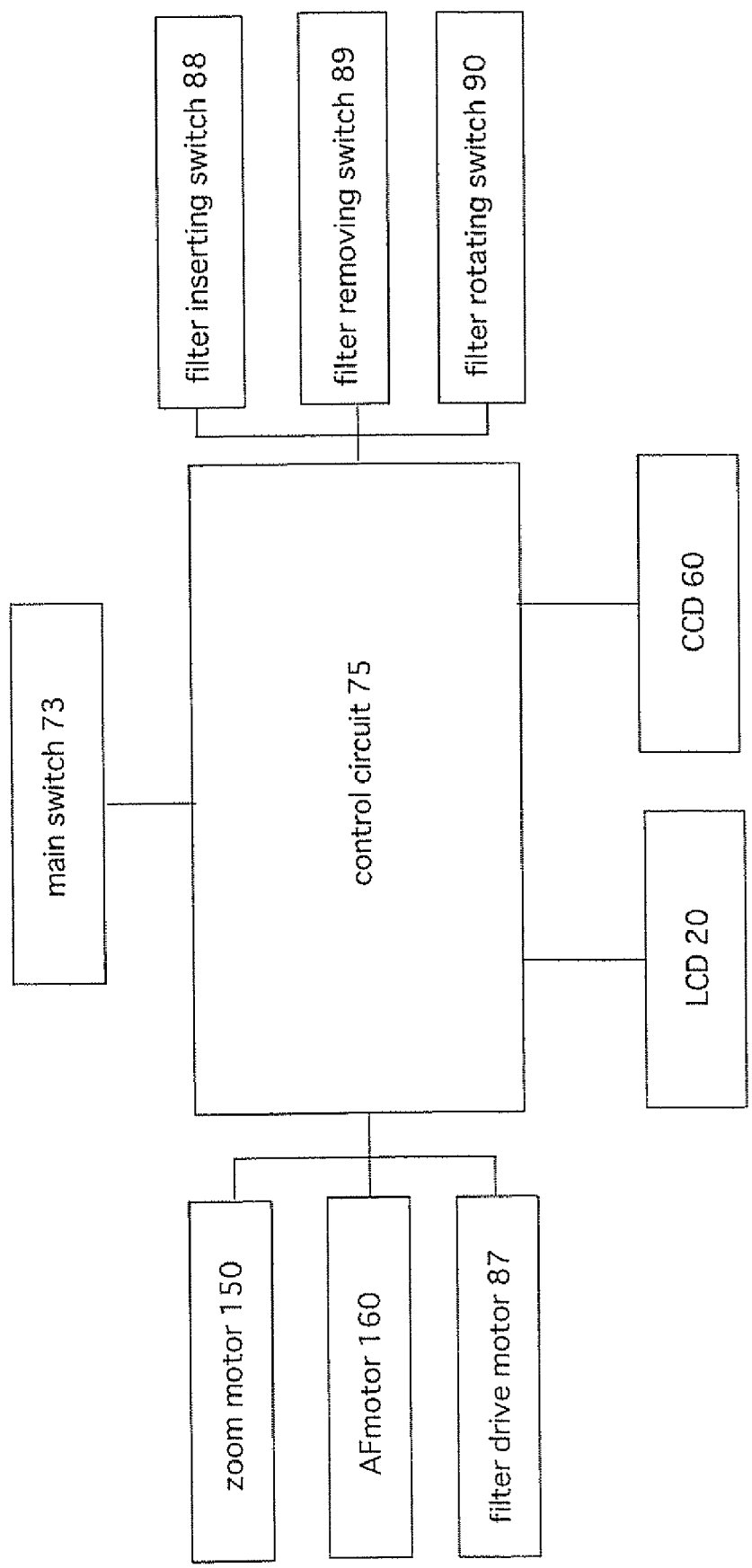
FIG. 22 is a block diagram of electrical components of the digital camera shown in FIGS. 1 and 2, showing connections among the electrical components.

The digital camera 70 is provided with the following three manual operation switches: a filter inserting switch 88, a filter removing switch 89 and a filter rotating switch 90 (see FIG. 22). The filter drive motor 87 is driven forward and reverse in accordance with operations of the filter inserting switch 88 and the filter removing switch 89, respectively. More specifically, the drive gear 86 is rotated in the aforementioned direction K1 by the filter drive motor 87 upon the filter inserting switch 88 being operated, and the drive gear 86 is rotated in the aforementioned direction K2 by the filter drive motor 87 upon the filter removing switch 89 being operated. The filter drive motor 87 is a pulse motor. Upon inputting an ON signal (insertion signal) via the filter inserting switch 88, the control circuit 75 controls the number of drive pulses for driving the filter drive motor 87 to rotate the insertable/retractable filter holding frame 80 from the aforementioned radially retracted position to the aforementioned inserted position. On the other hand, upon inputting an ON signal (remove signal) via the filter removing switch 89, the control circuit 75 controls the number of drive pulses for driving the filter drive motor 87 to rotate the insertable/retractable filter holding frame 80 from the aforementioned inserted position to the aforementioned radially retracted position.

Upon the filter rotating switch 90 being operated when the insertable/retractable filter holding frame 80 is in the inserted position, the drive gear 86 is rotated in the filter inserting direction (the aforementioned direction K1) by the filter drive motor 87. Rotating the drive gear 86 in the filter inserting direction in a state where the insertable/retractable filter holding frame 80 is in the inserted state (positioned on the photographing optical axis Z1) causes the filter holding ring 81 to rotate on the photographing optical axis Z1. This rotation of the filter holding ring 81 changes the polarization effect produced by the polarizing filter PF, and accordingly, the user of the digital camera 70 can rotate the filter holding ring 81 to a point where an desired object image can be obtained while visually checking the object image indicated on the LCD panel 20.

Operations of the above described drive mechanism for driving the polarizing filter PF will be discussed hereinafter. When the digital camera 70 is in a ready-to-photograph state as shown in FIG. 1, the control circuit 75 controls the operation of the filter drive motor 87 so that the filter drive motor 87 rotates in the filter inserting direction to insert the polarizing filter PF (the insertable/retractable filter holding frame 80) into a photographing optical path between the second lens group LG2 and the third lens group LG3 on the photographing optical axis Z1 in accordance with an ON signal of the filter inserting switch 88, or controls the operation of the filter drive motor 87 so that the filter drive motor 87 rotates in a filter removing direction to move the polarizing filter PF (the insertable/retractable filter holding frame 80) out of the photographing optical path to thereby move the polarizing filter PF from the photographing optical axis Z1 onto the retracted optical axis Z2 in accordance with an ON signal of the filter removing switch 89. As described above, this filter inserting/removing operation can be carried out without interfering with operations of other optical elements in the entire zooming range of the zoom lens 71. Additionally, when the polarizing filter PF is in the inserted position (on the photographing optical axis Z1), the control circuit 75 controls the operation of the filter drive motor 87 so that the filter drive motor 87 rotates in the filter inserting direction to rotate the polarizing filter PF (the filter holding ring 81) in accordance with an ON signal of the filter rotating switch 90. Note that the control circuit 75 does not drive the filter drive motor 87 even if the filter rotating switch 90 is operated when the polarizing filter PF (the insertable/retractable filter holding frame 80) is in the radially retracted position (on the retracted optical axis Z2).

Upon inputting a switching signal for moving the digital camera 70 from a ready-to-photograph state shown in FIG. 1, in which the insertable/retractable filter holding frame 80 lies on the photographing optical axis Z1, to the fully-retracted state shown in FIG. 2, i.e., upon the main switch 73 of the digital camera 70 being turned OFF in a state where the filter inserting switch 88 is ON, the control circuit 75 drives the filter drive motor 87 in the filter removing direction to move the polarizing filter PF (the insertable/retractable filter holding frame 80) from the inserted position on the photographing optical axis Z1 to the radially retracted position on the retracted optical axis Z2. Subsequently, the control circuit 75 drives the zoom motor 150 in the lens barrel retracting direction to move the second lens group moving frame B rearward in the optical axis direction. Thereupon, the second lens frame 6 rotates to move from the photographing position (in which the second lens group LG2 is positioned on the photographing optical axis Z1) to the radially retracted position (in which the second lens group LG2 is positioned on the retracted optical axis Z2). In the case where the insertable/retractable filter holding frame 80 has been moved to the radially retracted position on the retracted optical axis Z2 when the main switch 73 is turned OFF, the control circuit 75 omits the operation for driving the filter drive motor 87 and performs a lens barrel retracting operation in which the zoom motor 150 is driven to fully retract the zoom lens 71 into the camera body 72 as shown in FIG. 2. FIGS. 29 and 30 show this state in which both the second lens frame 6 and the insertable/retractable filter holding frame 80 are removed from respective positions thereof on the photographing optical axis Z1. As can be understood from these drawings, the second lens group LG2 and the polarizing filter PF have been rotated in the same direction about the pivot shaft 33 to be thereby positioned adjacent to each other on the retracted optical axis Z2 in the forward/rearward direction. In this manner, by removing the second lens group LG2 and the polarizing filter PF in the same direction from respective positions on the photographing optical axis Z1, the space for the second lens group LG2 and the polarizing filter PF to be radially retracted can be made smaller than the case where the second lens group LG2 and the polarizing filter PF are removed in different directions from respective positions on the photographing optical axis Z1. In addition, simplification of the support mechanism for supporting the second lens frame 6 and the insertable/retractable filter holding frame 80 is achieved by a reduction of the number of elements thereof because the second lens frame 6 and the insertable/retractable filter holding frame 80 are pivoted about a common pivot shaft, i.e., the pivot shaft 33.

The control circuit 75 continues to drive the zoom motor 150 in the lens barrel retracting direction even after the second lens frame 6 has rotated to the radially retracted position. This continuous driving of the zoom motor 150 causes the second lens group moving frame 8 to move rearward with the second lens frame 6 and the insertable/retractable filter holding frame 80 and to finally reach the position shown in FIG. 2. In the fully-retracted state of the zoom lens 71 shown in FIG. 2, the second lens group LG2 has been moved rearward to a position where the second lens group LG2 is positioned in an axial range substantially identical to an axial range in the optical axis direction in which the third lens group LG3 and the low-pass filter LG4 are positioned (i.e., so that the second lens group LG2 is positioned radially outside the third lens group LG3 and the low-pass filter LG4), and the polarizing filter PF has been moved rearward to a position where the polarizing filter PF is positioned in an axial range substantially identical to an axial range in the optical axis direction in which the CCD image sensor 60 is positioned (i.e., so that the polarizing filter PF is positioned radially outside the CCD image sensor 60). Accordingly, the length of the zoom lens 71 in the fully-retracted state thereof is reduced by a length substantially corresponding to the thickness of the second lens group LG2 and the polarizing filter PF, which makes it possible to reduce the thickness of the digital camera 70 in the optical axis direction, i.e., in the horizontal direction as viewed in FIG. 2. In the fully-retracted state of the zoom lens 71 shown in FIG. 2, the control circuit 75 does not drive the filter drive motor 87 even if any of the filter inserting switch 88, the filter removing switch 89 and the filter rotating switch 90 is operated.

Contrary to the above described lens barrel retracting operation, upon inputting a switching signal for moving the digital camera 70 from the fully-retracted state shown in FIG. 2 to a ready-to-photograph state shown in FIG. 1, the control circuit 75 drives the zoom motor 150 in the lens barrel advancing direction to move the zoom lens 71 to the ready-to-photograph state at the wide-angle extremity as shown by a lower half portion of the zoom lens 71 in FIG. 1. During the course of this advancing movement of the zoom lens 71, the second lens frame 6 rotates about the pivot shaft 33 from the radially retracted position to the photographing position so that the second lens group LG2 is positioned on the photographing optical axis Z1. During this lens barrel advancing operation, the control circuit 75 does not drive the filter drive motor 87, and accordingly, the insertable/retractable filter holding frame 80 is moved forward in the optical axis direction together with the second lens group moving frame 8 while holding the polarizing filter PF in the radially retracted position on the retracted optical axis Z2.

When the zoom lens 71 moves from a ready-to-photograph state shown in FIG. 1 to the fully-retracted state shown in FIG. 2, the insertable/retractable filter holding frame 80 can be rotated in the filter removing direction by the rotation operation of the second lens frame 6 from the photographing position to the radially retracted position, not by the aforementioned driving force generated by the filter drive motor 87. Specifically, in a ready-to-photograph state of the zoom lens 71, the stop projection 6f of the second lens frame 6 is in contact with the stop portion 80g as shown in FIG. 33, and a rotation of the second lens frame 6 about the pivot shaft 33 from the photographing position to the radially retracted position (clockwise as viewed in FIG. 33) causes the stop projection 6f to press the stop portion 80g to rotate the insertable/retractable filter holding frame 80 to the radially retracted position together with the second lens frame 6. Due to this structure, even when the filter drive motor 87 is not properly driven accidentally because of some kind of control error, the zoom lens 71 can be reliably retracted to the retracted position while preventing the polarizing filter PF and the insertable/retractable filter holding frame 80 from interfering with such elements as the AF lens frame 51 and the CCD holder 21, which are positioned behind the polarizing filter PF and the insertable/retractable filter holding frame 80 in the optical axis direction, upon the main switch 73 being turned ON.

According to the zoom lens 71 of the above described embodiment of the digital camera 70, the polarizing filter PF can be inserted into and retracted from a photographing optical path by driving the filter drive motor 87 forward and reverse, respectively, in a ready-to-photograph state of the zoom lens 71. Moreover, the polarizing filter PF can be rotated at a fixed position by driving the filter drive motor 87 in the filter inserting direction in a state where the polarizing filter PF is positioned on the photographing optical axis Z1. Accordingly, the drive mechanism for the polarizing filter PF can be simplified and miniaturized since both the operations for inserting and removing the polarizing filter PF into and from an optical path on the photographing optical axis Z1 and the operation for rotating the polarizing filter PF at a fixed position on the photographing optical axis Z1 can be carried out by a single motor, i.e., the filter drive motor 87. Moreover, the number of elements of the drive mechanism for the polarizing filter PF can be reduced since the gear train including the friction gear 82, the idle gear 83, the rotation control gear 84, the idle gear 85 and the drive gear 86 are used in both the operations for inserting and removing the polarizing filter PF into and from an optical path on the photographing optical axis Z1 and the operation for rotating the polarizing filter PF at a fixed position on the photographing optical axis Z1. Furthermore, the drive controller which switches the driving force of the filter drive motor 87 between the filter inserting/removing operation and the fixed-position filter rotating operation is constructed of the spring washer 82a and the rotation limit pin 35 in addition to the aforementioned gear train and is accordingly simple in structure, thus contributing to miniaturization and simplification of the drive mechanism for the polarizing filter PF.

However, the present invention is not limited solely to the above illustrated embodiment. Obvious changes may be made in the specific embodiment of the present invention described herein, such modifications being within the spirit and scope of the invention claimed. For instance, although the polarizing filter PF is used as an example of an insertable/rotatable optical element (specific-effect producing rotatable optical element) in the above illustrated embodiment, the present invention can be generally applied to a lens barrel including any other type of optical element such as a cross filter or a polygonal-surface multi image filter which produces a specific effect in an inserted state when rotated on the photographing optical axis.

Although the rotation of the rotation control gear 84 is transferred to the filter gear 81a of the filter holding ring 81 via the idle gear 83 and the friction gear 82 in the above described embodiment of the digital camera 70, a similar effect can be obtained by further simplifying the drive mechanism for the polarizing filter PF, i.e., by omitting the idle gear 83 and the friction gear 82 and making the rotation control gear 84 and the filter gear 81a engaged with each other. In this case, similar to the above described embodiment, the rotation control gear 84 and the filter gear 81a serve as a sun gear and a planetary gear, respectively, and a rotational friction which corresponds to that produced by the friction gear 82 with the spring washer 82a only has to be exerted on either the sun gear or the planetary gear to impose resistance on the insertable/retractable filter holding frame 80 when it rotates. In other words, the gear train for transmitting the rotational driving force of a motor (the filter drive motor 87) to the insertable/rotatable optical element only needs to include a planet gear system or the like which consists of a sun gear and a planetary gear or the like.

Although the present invention is suitably applied to a zoom lens such as the above illustrated embodiment of the zoom lens, the present invention can also be applied to a fixed-focal-length lens to obtain an effect similar to that obtained in the above illustrated embodiment of the zoom lens.

It is indicated that all matter contained herein is illustrative and does not limit the scope of the present invention.

What is claimed is:

1. A lens barrel comprising:
   an imaging optical system including a plurality of lens groups located on an optical axis;
   an insertable/rotatable optical element which produces a specific photographic effect when rotated on said optical axis; and
   a drive mechanism including a motor which moves said insertable/rotatable optical element between an inserted position, in which said insertable/rotatable optical element is positioned on said optical axis, and a removed position, in which said insertable/rotatable optical element is removed from said optical axis by forward and reverse rotations of said motor, respectively,
   wherein said drive mechanism rotates said insertable/rotatable optical element on said optical axis by said forward rotation of said motor when said insertable/rotatable optical element is in said inserted position.

2. The lens barrel according to claim 1, wherein said drive mechanism comprises:
   an insertable/retractable frame pivoted about a pivot parallel to said optical axis to be rotatable forward and reverse to move said insertable/rotatable optical element between said inserted position and said removed position;
   an annular holding frame which holds said insertable/rotatable optical element, and is rotatably supported by said insertable/retractable frame; and
   a gear train for transmitting a rotational driving force of said motor to said annular holding frame.

3. The lens barrel according to claim 2, wherein said gear train comprises:
   a sun gear arranged coaxially with said pivot to be rotatable thereon;
   a planetary gear which meshes with said sun gear, said planetary gear being rotatably supported by said insertable/retractable frame and capable of transmitting a rotation thereof to said annular holding frame; and
   a drive controller which causes said planetary gear revolve forward and reverse around said sun gear while rotating on an axis of said planetary gear in accordance with forward and reverse rotations of said motor when said insertable/retractable frame rotates forward and reverse to move said insertable/rotatable optical element between said inserted position and said removed position, respectively, and further causes said planetary gear to rotate on said axis thereof without changing a relative position between said planetary gear and said sun gear to thereby rotate said annular holding frame in accordance with said forward rotation of said motor when said insertable/retractable frame is in a position so that said insertable/rotatable optical element is positioned at said inserted position.

4. The lens barrel according to claim 3, wherein said drive controller comprises:

a rotation-resistance imposing member which imposes rotational resistance on at least one gear of said gear train; and a rotation limit member which prevents said insertable/retractable frame from further rotating forward to thereby prevent said insertable/rotatable optical element from moving beyond said inserted position when said insertable/rotatable optical element is positioned at said inserted position, wherein, when said rotation limit member does not prevent said insertable/retractable frame from rotating, said rotation-resistance imposing member prevents said planetary gear from rotating about said axis thereof so that said planetary gear revolves around said sun gear in accordance with forward and reverse rotations of said motor, and wherein, when said rotation limit member prevents said insertable/retractable frame from rotating at said inserted position of said insertable/rotatable optical element, said rotation-resistance imposing member allows said planetary gear to rotate about said axis thereof in accordance with said forward rotation of said motor.

5. The lens barrel according to claim 1, wherein said insertable/rotatable optical element comprises a polarizing filter.

6. The lens barrel according to claim 1, wherein said insertable/rotatable optical element is rotated about said optical axis by said drive mechanism when positioned at said inserted position.

7. The lens barrel according to claim 1, further comprising a second drive mechanism which positions said plurality of lens groups on said optical axis in a ready-to-photograph state of said lens barrel, removes a part of said plurality of optical elements to a position off said optical axis, and moves said removable part of said plurality of lens groups rearward together with at least a part of the remaining part of said plurality of lens groups, which remain on said optical axis, when said lens barrel is moved from said ready-to-photograph state to a fully-retracted state, wherein said drive mechanism moves said insertable/rotatable optical element independently of said removable part of said plurality of lens groups between said inserted position and said removed position in said ready-to-photograph state of said lens barrel, and moves said insertable/rotatable optical element to said removed position and further moves said insertable/rotatable optical element rearward together with said removable part of said plurality of lens groups when said lens barrel changes from said ready-to-photograph state to said fully-retracted state.

8. The lens barrel according to claim 2, wherein said insertable/retractable frame comprises a front support plate and a rear support plate which are fixed to each other with said annular holding frame and at least a part of said gear train being held between said front support plate and said rear support plate.

9. The lens barrel according to claim 8, wherein said annular holding frame comprises a gear which is formed on an outer edge of said annular holding frame to be engaged with a relay gear of said gear train.

10. The lens barrel according to claim 8, wherein at least one of said front support plate and said rear support plate comprises a circular flange positioned between said front support plate and said rear support plate, said annular holding frame being fitted on said circular flange to be freely rotatable relative thereto on an axis of said circular flange.

11. The lens barrel according to claim 8, wherein at least one of said front support plate and said rear support plate comprises at least one pin on which at least one gear of said gear train is rotatably fitted.

12. A lens barrel comprising:

a plurality of lens groups arranged on an optical axis;

a specific-effect optical element which can be rotated on an axis thereof and can be inserted into and removed from an optical path on said optical axis; and a drive mechanism including a motor which inserts and removes said specific-effect optical element into and from said optical path to be positioned on and off said optical axis by forward and reverse rotations of said motor, respectively, wherein said drive mechanism rotates said specific-effect optical element on said optical axis while holding said specific-effect optical element in said optical path by said forward rotation of said motor when said specific-effect optical element is positioned on said optical axis.

* * * * *